(12) United States Patent
Kawamura et al.

(10) Patent No.: US 7,885,464 B2
(45) Date of Patent: Feb. 8, 2011

(54) APPARATUS, METHOD, AND PROGRAM FOR HANDWRITING RECOGNITION

(75) Inventors: Akinori Kawamura, Kunitachi (JP); Yojiro Tonouchi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1018 days.

(21) Appl. No.: 11/296,223

(22) Filed: Dec. 8, 2005

(65) Prior Publication Data

US 2006/0088216 A1  Apr. 27, 2006

Related U.S. Application Data

(63) Continuation of application No. 09/984,672, filed on Oct. 30, 2001, now Pat. No. 7,013,046.

(30) Foreign Application Priority Data

Oct. 31, 2000 (JP) ............................. 2000-333919
Sep. 10, 2001 (JP) ............................. 2001-274147

(51) Int. Cl.
G06K 9/18 (2006.01)
G06K 9/00 (2006.01)

(52) U.S. Cl. ...................................... 382/186; 382/187

(58) Field of Classification Search .......... 382/186–187
See application file for complete search history.

(56) References Cited

U.S. PATENT DOCUMENTS

| | | | |
|---|---|---|---|
| 4,607,386 A | | 8/1986 | Morita et al. |
| 4,672,677 A | * | 6/1987 | Yamakawa .................. 382/185 |
| 5,329,598 A | * | 7/1994 | Geist ........................... 382/228 |
| 5,335,289 A | * | 8/1994 | Abdelazim .................. 382/177 |
| 5,454,046 A | | 9/1995 | Carman, II |
| 5,481,277 A | * | 1/1996 | Morinaga .................... 345/471 |
| 5,513,278 A | | 4/1996 | Hashizume et al. |
| 5,533,147 A | * | 7/1996 | Arai et al. .................... 382/179 |
| 5,706,496 A | * | 1/1998 | Noguchi et al. ..................... 1/1 |
| 5,724,457 A | * | 3/1998 | Fukushima .................. 382/311 |
| 5,729,630 A | | 3/1998 | Ikeda |
| 5,745,599 A | * | 4/1998 | Uchiyama et al. ........... 382/217 |
| 5,812,697 A | | 9/1998 | Sakai et al. |
| 5,850,477 A | | 12/1998 | Takada |
| 5,881,169 A | * | 3/1999 | Henry, Jr. .................... 382/187 |
| 5,881,312 A | * | 3/1999 | Dulong .......................... 710/7 |
| 5,917,941 A | * | 6/1999 | Webb et al. .................. 382/177 |

(Continued)

FOREIGN PATENT DOCUMENTS

JP  7-152476  6/1995

(Continued)

*Primary Examiner*—Vikkram Bali
*Assistant Examiner*—Michelle Entezari
(74) *Attorney, Agent, or Firm*—Oblon, Spivak, McClelland, Maier & Neustadt, L.L.P.

(57) ABSTRACT

A handwriting recognition apparatus is disclosed. In one embodiment the apparatus comprises an input device having a handwriting input area and configured to input a plurality of strokes constructing a plurality of characters written successively on the handwriting input area, and a recognition device configured to recognize the characters based on the strokes input by the input device, shapes of the strokes constructing two characters which are written successively and positional relations between or among the strokes constructing the two characters, whenever one stroke is input by the input device.

16 Claims, 30 Drawing Sheets

U.S. PATENT DOCUMENTS

| | | |
|---|---|---|
| 5,923,793 A | 7/1999 | Ikebata |
| 6,052,482 A | 4/2000 | Arai et al. |
| 6,084,985 A * | 7/2000 | Dolfing et al. ............. 382/187 |
| 6,094,506 A | 7/2000 | Hullender |
| 6,111,985 A * | 8/2000 | Hullender et al. ........... 382/229 |
| 6,310,615 B1 * | 10/2001 | Davis et al. ................. 345/173 |
| 6,507,678 B2 * | 1/2003 | Yahagi ....................... 382/305 |
| 6,694,056 B1 * | 2/2004 | Ito et al. ..................... 382/186 |
| 6,795,579 B2 * | 9/2004 | Tang et al. .................. 382/185 |
| 7,031,519 B2 * | 4/2006 | Elmenhurst ................. 382/181 |
| 7,218,781 B2 * | 5/2007 | van Meurs .................. 382/185 |
| 7,668,407 B1 * | 2/2010 | Baker et al. ................. 382/321 |

FOREIGN PATENT DOCUMENTS

| | | |
|---|---|---|
| JP | 7-296103 | 11/1995 |
| JP | 8-328734 | 12/1996 |
| JP | 9-44600 | 2/1997 |
| JP | 2001-184458 | 7/2001 |

\* cited by examiner

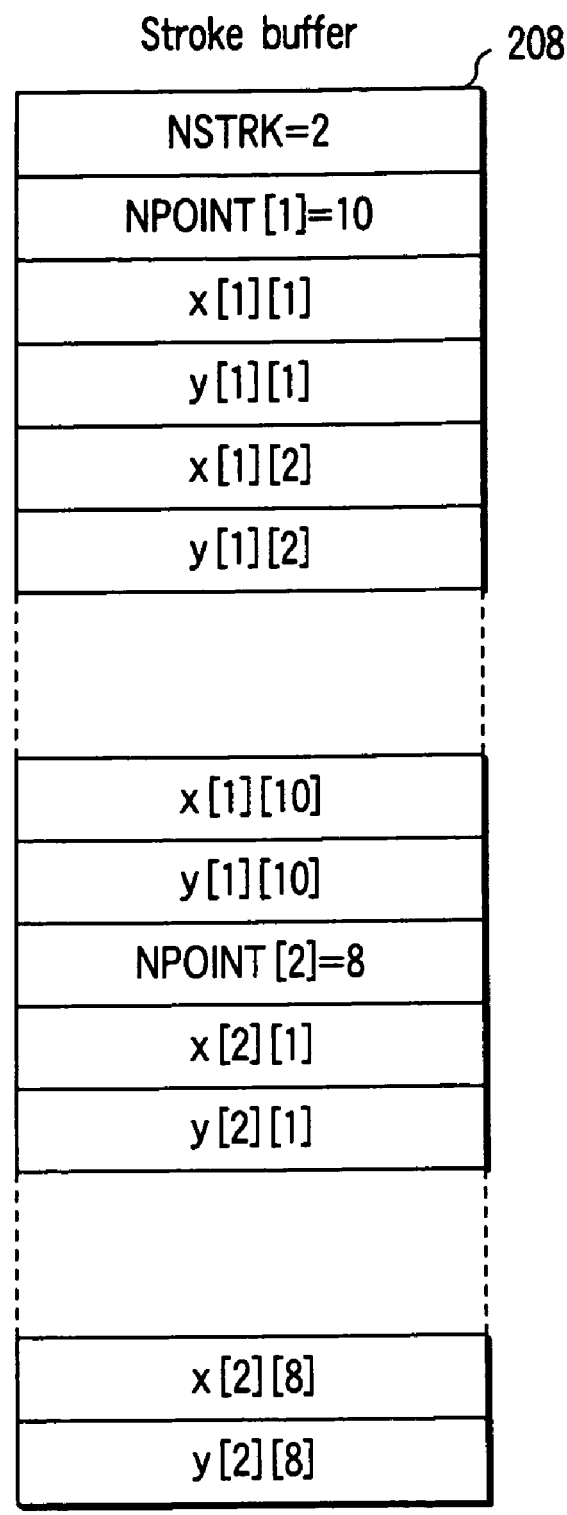
F I G. 6

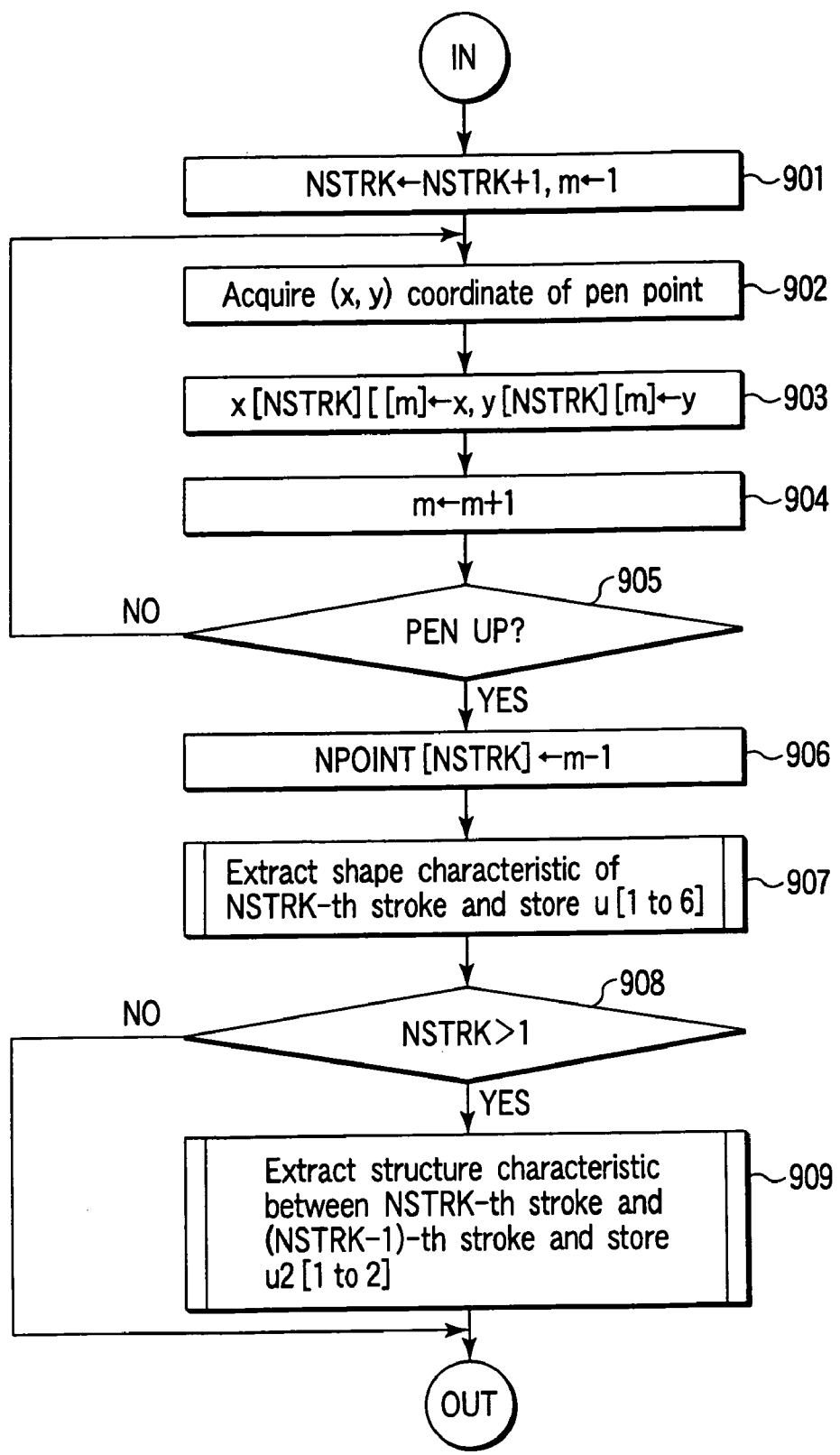
F I G. 11

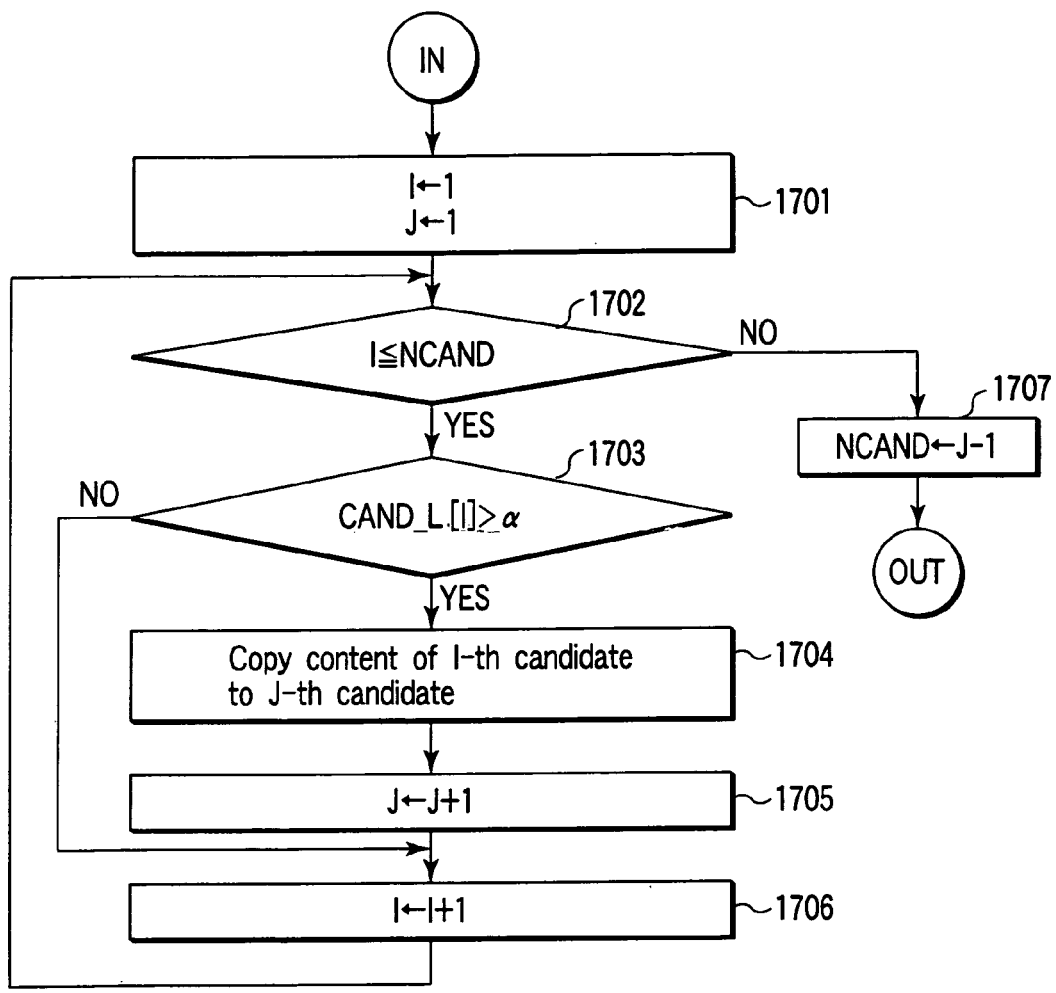
F I G. 19
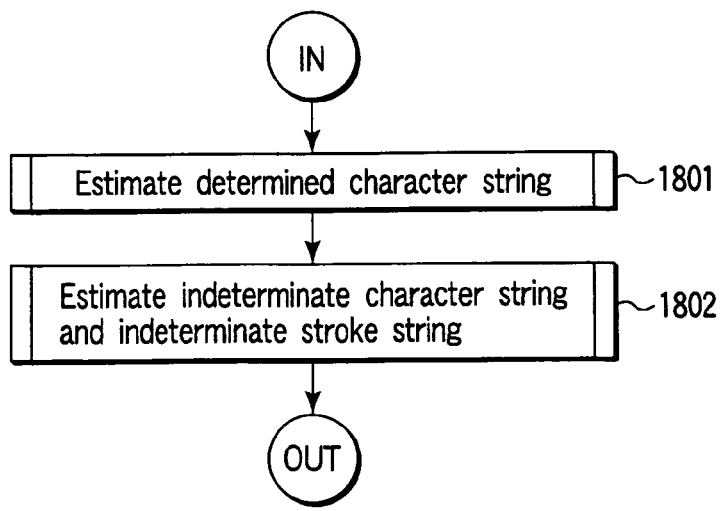
F I G. 20

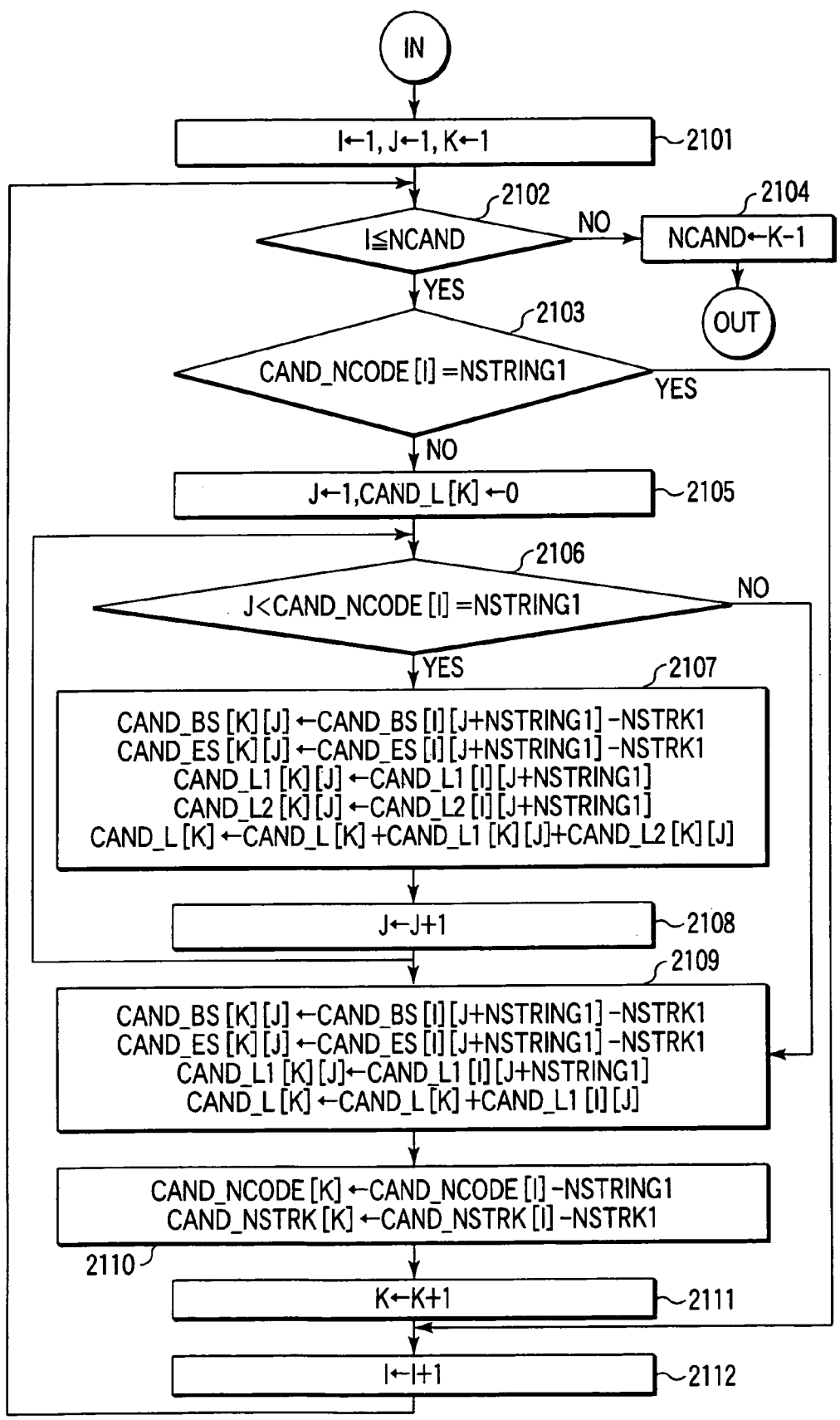
F I G. 23

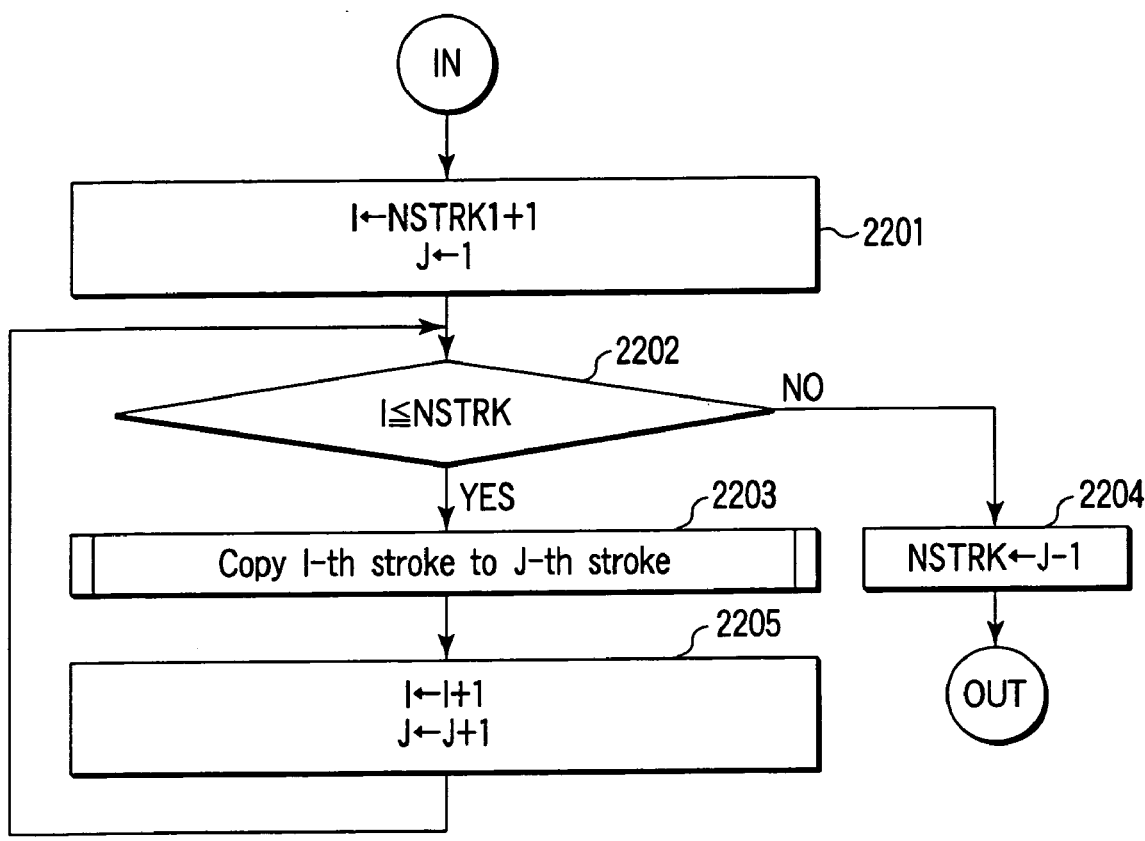
F I G. 24

| Stroke/biliteral structure | | Characteristic | | Dictionary of character structure/dictionary of biliteral structure | Character |
|---|---|---|---|---|---|
| あ | あ | u[1~6] | ⇔ | s[1][1][1~6]  <br> σ[1][1][1~6] | あ <br> 0x82a0 |
| | ॱ | u2[1~2] | ⇔ | s2[1][1][1~2] <br> σ2[1][1][1~2] | |
| | し | u[1~6] | ⇔ | s[1][2][1~6] <br> σ[1][2][1~6] | |
| | ःः | u2[1~2] | ⇔ | s2[1][2][1~2] <br> σ2[1][2][1~2] | |
| | の | u[1~6] | ⇔ | s[1][3][1~6] <br> σ[1][3][1~6] | |
| | ⋇ | u2[1~2] | ⇔ | z[1~2] <br> θ[1~2] | Character separation |
| い | し | u[1~6] | ⇔ | s[2][1][1~6] <br> σ[2][1][1~6] | い <br> 0x82a2 |
| | ゛ | u2[1~2] | ⇔ | s2[2][1][1~2] <br> σ2[2][1][1~2] | |
| | ヽ | u[1~6] | ⇔ | s[2][2][1~6] <br> σ[2][2][1~6] | |

FIG. 25

| Stroke number | Input stroke | Recognized result display screen | Display screen after one-character backspace deletion instruction | Display screen after determination instruction |
|---|---|---|---|---|
| 0 | | ■ | ■ | ■ |
| 1 | 一 | ⇒■ | ■ | ■ |
| 2 | し | ⇒■ | ■ | ■ |
| 3 | の | あ■ | ■ | あ■ |
| 4 | し | あし■ | あ■ | あし■ |
| 5 | 一 | あし⇒■ | あし■ | あし■ |
| 6 | / | あし⇒■ | あし■ | あし■ |
| 7 | - | あし⇒■ | あし■ | あし■ |
| 8 | 、 | あした■ | あし■ | あした■ |

FIG. 26

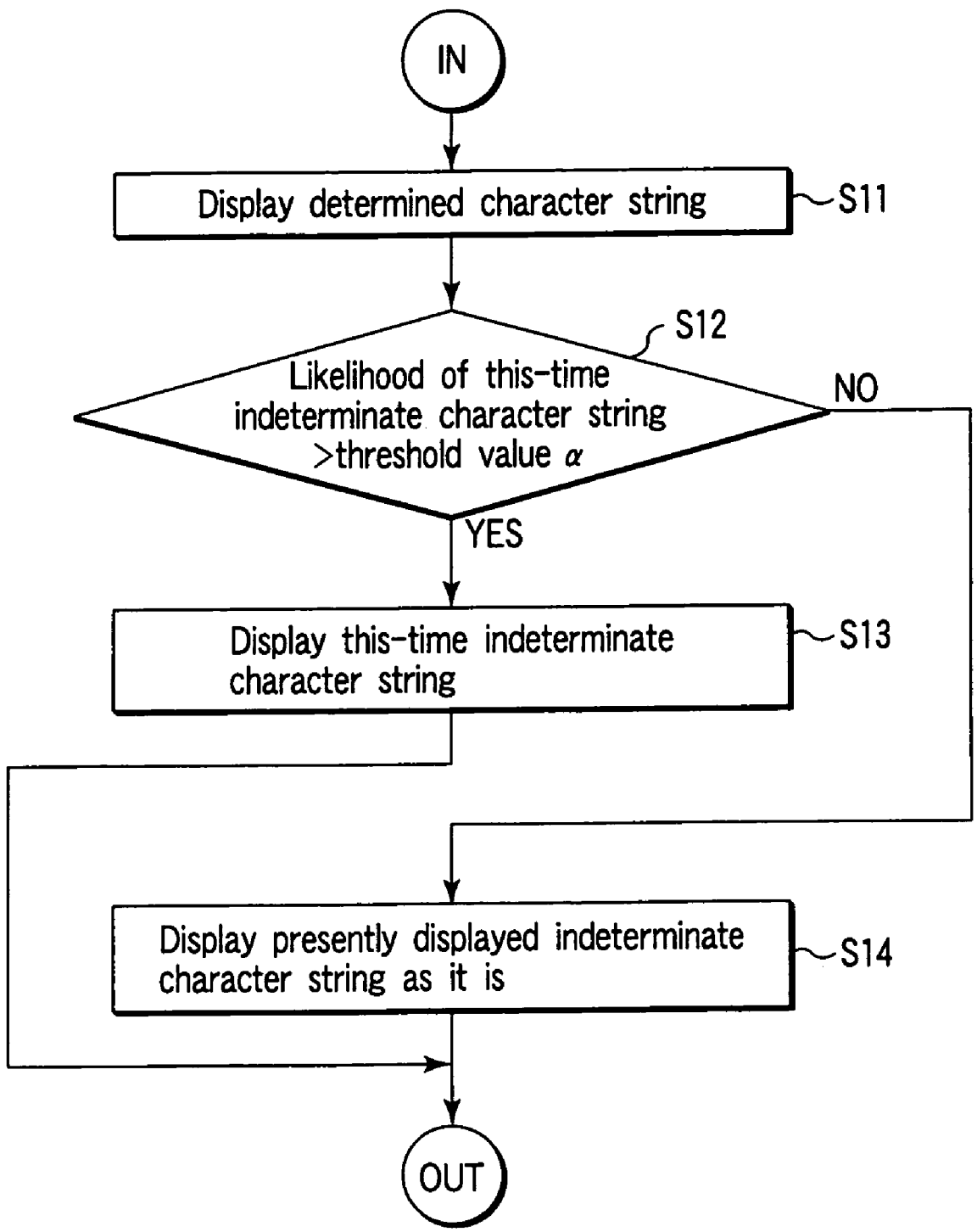
F I G. 27

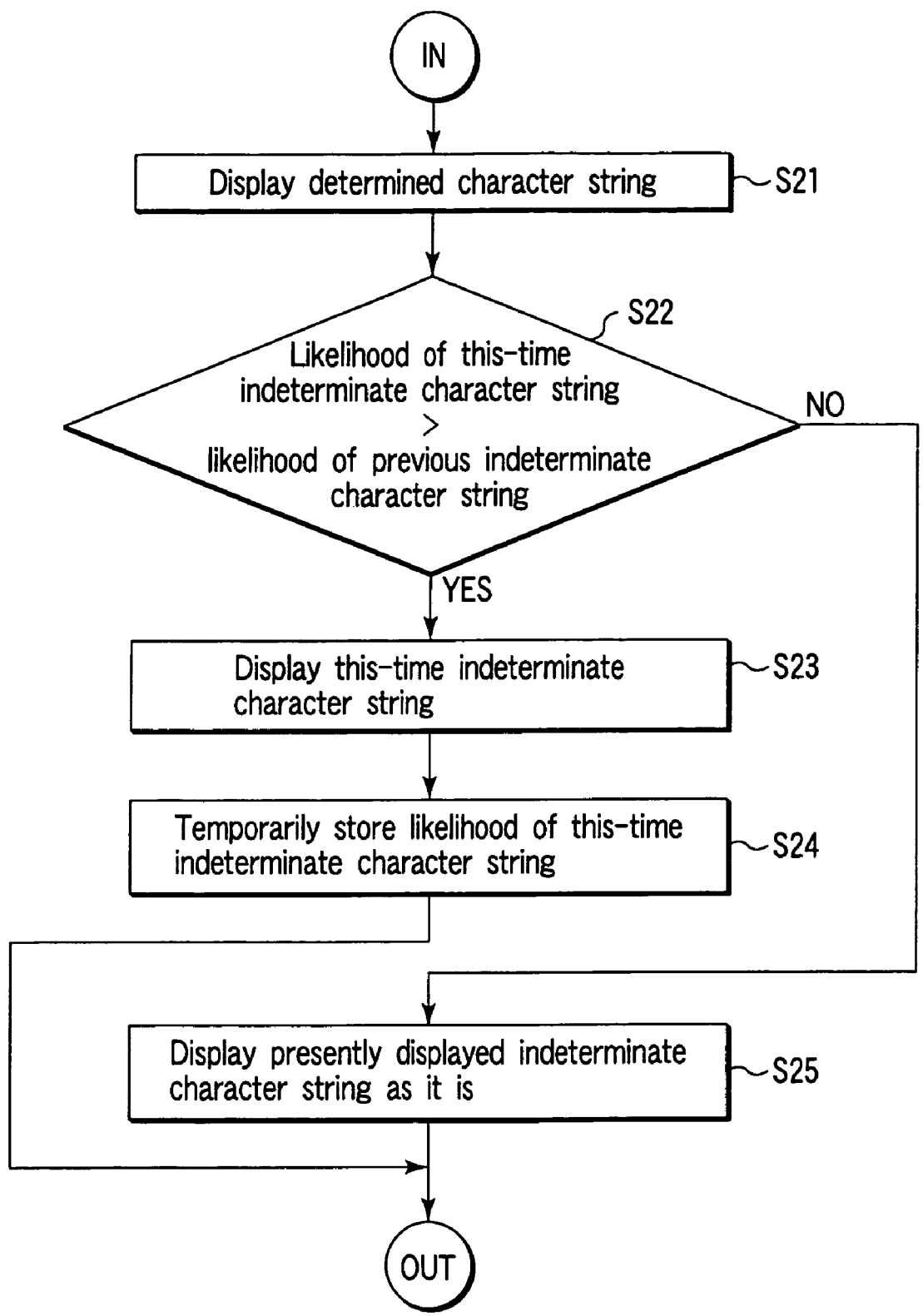
F I G. 28

|  | Determined character string | Indeterminate character string | Recognized result display screen |
|---|---|---|---|
| 「て」 First stroke | NULL | 「て」 | て |
| 「が」 First stroke | 「て」 | 「つ」 | てつ |
| 「が」 Second stroke | NULL | 「つ」 | てつ |
| 「が」 Third stroke | NULL | 「か」 | てか |
| 「が」 Fourth stroke | NULL | 「か」 | てか |
| 「が」 Fifth stroke | NULL | 「が」 | てが |
| 「き」 First stroke | NULL | 「が—」 | てが— |
| 「き」 Second stroke | 「が」 | 「こ」 | てがこ |
| 「き」 Third stroke | NULL | 「こ」 | てがこ |
| 「き」 Fourth stroke | 「き」 | NULL | てがき |

FIG. 29

Handwriting display example of "い"

Handwriting display example of "あ"

Handwriting display example of "た"

APPARATUS, METHOD, AND PROGRAM FOR HANDWRITING RECOGNITION

CROSS-REFERENCE TO RELATED APPLICATIONS

This application is based upon and claims the benefit of priority from the prior Japanese Patent Applications No. 2000-333919, filed Oct. 31, 2000; and No. 2001-274147, filed Sep. 10, 2001, the entire contents of both of which are incorporated herein by reference.

BACKGROUND OF THE INVENTION

1. Field of the Invention

The present invention relates to apparatus, method for handwriting recognition.

2. Description of the Related Art

In a conventional handwriting recognition apparatus for automatically segmenting and recognizing a character from handwriting written on a tablet (a coordinate input tablet) or a digitizer pad, and displaying a result, there are four recognition techniques (recognition methods) as follows:

(1) a technique for preparing a plurality of character frames corresponding one character, writing one character in one character frame in order, and segmenting and recognizing the character;

(2) a technique for detecting that a pen is detached from a tablet for a predetermined or more time, judging an end of the character, and segmenting and recognizing the character;

(3) a technique for explicitly instructing an end of writing of one character with a recognition execution button, and segmenting and recognizing the character; and (4) a technique for defining one character with a special one stroke writing, detecting that a stroke is inputted and the pen is detached from the tablet, then determining one character input, and segmenting and recognizing the character.

However, the aforementioned conventional recognition technique, for example, (1) has a problem that a user has to be conscious of a size and position of the character frame during input of the character, and cannot naturally input the character during writing of the character. Moreover, when mounting of the technique on a small-sized information apparatus is considered, a character writing area with a sufficient size cannot be secured. Therefore, when the plurality of character frames are prepared, the size of the writing area per one character is reduced. There is also a problem that the user cannot easily write the character.

On the other hand, since it is unnecessary to prepare the plurality of character frames in the conventional recognition techniques (2), (3), the writing area per one character can be enlarged, and it is possible to avoid the problem of technique (1). However, in the technique (2), when a plurality of characters are continuously inputted, the pen has to be detached from the tablet for the predetermined or more time for each one-character writing. Moreover, in the technique (3), an operation which comprises pressing the recognition execution button for each one-character input and which is not inherently related to the writing of the character is necessary for each one-character writing. Therefore, the recognition techniques (2), (3) have a problem that it is difficult to smoothly input the character string.

Moreover, in the conventional recognition technique (4), the problems in the techniques (1), (2), (3) can be avoided, but the user is forced to memorize one-stroke writing of each character beforehand. Therefore, particularly when there are a large number of characters as recognition objects, a great burden is imposed on the user.

BRIEF SUMMARY OF THE INVENTION

The present invention has been developed in consideration of the aforementioned circumstances, and an object thereof is to automatically recognize characters even when a user simply successively writes characters without being conscious of an end of the character.

According to an aspect of the present invention, there is provided a handwriting recognition apparatus comprising: an input device having a handwriting input area and configured to input a plurality of strokes constructing a plurality of characters written successively on the handwriting input area; and a recognition device configured to recognize the characters based on the strokes input by the input device, shapes of the strokes constructing two characters which are written successively and positional relations between or among the strokes constructing the two characters, whenever one stroke is input by the input device.

According to an aspect of the present invention, there is provided a handwriting recognition apparatus comprising: a handwriting recognition apparatus comprising: an input device having a handwriting input area and configured to input a plurality of strokes constructing a plurality of characters which are written successively and superimposed on each other on the handwriting input area, a size of the handwriting area corresponding to a size of one character; and a recognition device configured to recognize the characters based on the strokes input by the input device, shapes of the strokes constructing two characters which are written successively and positional relations between or among the strokes constructing two characters which are written successively and superimposed on each other, whenever one stroke is input by the input device.

According to an aspect of the present invention, there is provided a handwriting recognition apparatus comprising: an input device having a handwriting input area and configured to input a plurality of strokes constructing a plurality of characters which are written successively on the handwriting input area; a memory device configured to store a plurality of character structure data items corresponding to a plurality of characters respectively, each of the characters being constructed by at least one stroke, each of the character structure data items indicating a shape of one or more strokes constructing a character and a positional relation between or among strokes constructing a character when the character is constructed by a plurality of strokes; a memory device configured to store a plurality of biliteral structure data items, each of the biliteral structure data items indicating a structural relation between two characters which are written successively, the structural relation between the two characters indicating positional relation between one or more strokes constructing the one of the two characters and one or more strokes constructing the other when the two characters are written successively; a recognition device configured to recognize the characters from one or more strokes input by the input device, in units of two characters which are written successively, by comparing shapes of the strokes and a positional relation between or among the strokes with the character structure data items and the biliteral structure data items, whenever one stroke is input by the input device, to obtain one or more recognized characters; and a display configured to display the one or more recognized characters.

According to an aspect of the present invention, there is provided a handwriting recognition apparatus comprising: an input device having a handwriting input area and configured to input a plurality of strokes constructing a plurality of characters which are written successively and superimposed on each other on the handwriting input area, a size of the handwriting input area corresponding to a size of one character; a memory device configured to store a plurality of character structure data items corresponding to a plurality of characters respectively, each of the characters being constructed by at least one stroke, each of the character structure data items indicating a shape of one or more strokes constructing a character and a positional relation between or among strokes constructing a character when the character is constructed by a plurality of strokes; a memory device configured to store a plurality of biliteral structure data items, each of the biliteral structure data items indicating a structural relation between two characters which are written successively and superimposed on each other, the structural relation between the two characters indicating positional relation between one or more strokes constructing the one of the two characters and one or more strokes constructing the other when the two characters are superimposed on each other; a recognition device configured to recognize the characters from one or more strokes input by the input device, in units of two characters which are written successively and superimposed on each other, by comparing shapes of the strokes and a positional relations between or among the strokes with the character structure data items and the biliteral structure data items, whenever one stroke is input by the input device, to obtain one or more recognized characters; and a display configured to display the one or more recognized characters.

According to an aspect of the present invention, there is provided a handwriting recognition method for recognizing a plurality of characters written successively on a handwriting input area, the method comprising: inputting a plurality of strokes constructing the plurality of characters written successively on the handwriting input area to obtain one or more input strokes; recognizing the characters based on the one or more input strokes, shapes of the strokes constructing two characters which are written successively and positional relations between or among the strokes constructing two characters which are written successively, whenever one stroke is input, to obtain one or more recognized characters; and displaying the one or more recognized characters.

According to an aspect of the present invention, there is provided a handwriting recognition method for recognizing a plurality of characters written successively and superimposed on each other on the handwriting input area, a size of the handwriting input area corresponding to a size of one character, the method comprising: inputting a plurality of strokes constructing the plurality of characters written on the handwriting input area to obtain one or more input strokes; recognizing the characters based on the one or more input strokes, shapes of the strokes constructing two characters which are written successively and positional relations between or among the strokes constructing two characters which are written successively and superimposed on each other, whenever one stroke is input, to obtain one or more recognized characters; and displaying the one or more recognized characters.

BRIEF DESCRIPTION OF THE SEVERAL VIEWS OF THE DRAWING

FIG. 6 is a diagram showing a data structure example of a stroke buffer 208 in FIG. 4.

FIG. 11 is a flowchart showing a detailed processing procedure in a step 802 in FIG. 10.

FIG. 19 is a flowchart showing a detailed processing procedure in a step 1406 in FIG. 16.

FIG. 20 is a flowchart showing a detailed processing procedure in a step 805 in FIG. 10.

FIG. 23 is a flowchart showing a detailed processing procedure in a step 807 in FIG. 10.

FIG. 24 is a flowchart showing a detailed processing procedure in a step 808 in FIG. 10.

FIG. 25 is an explanatory view of a collation relation between an input characteristic and a dictionary characteristic.

FIG. 26 is a diagram showing a recognized result display example.

FIG. 27 is a flowchart showing a display processing operation of a determined character string and indeterminate character string.

FIG. 28 is a flowchart showing another display processing operation of the determined character string and indeterminate character string.

FIG. 29 is a diagram showing an example of display of the determined character string and indeterminate character string estimated every time the stroke is written.

DETAILED DESCRIPTION OF THE INVENTION

An embodiment of the present invention will be described hereinafter with reference to the drawings.

(Configuration and Operation of Handwriting Recognition Apparatus)

Figure 1:
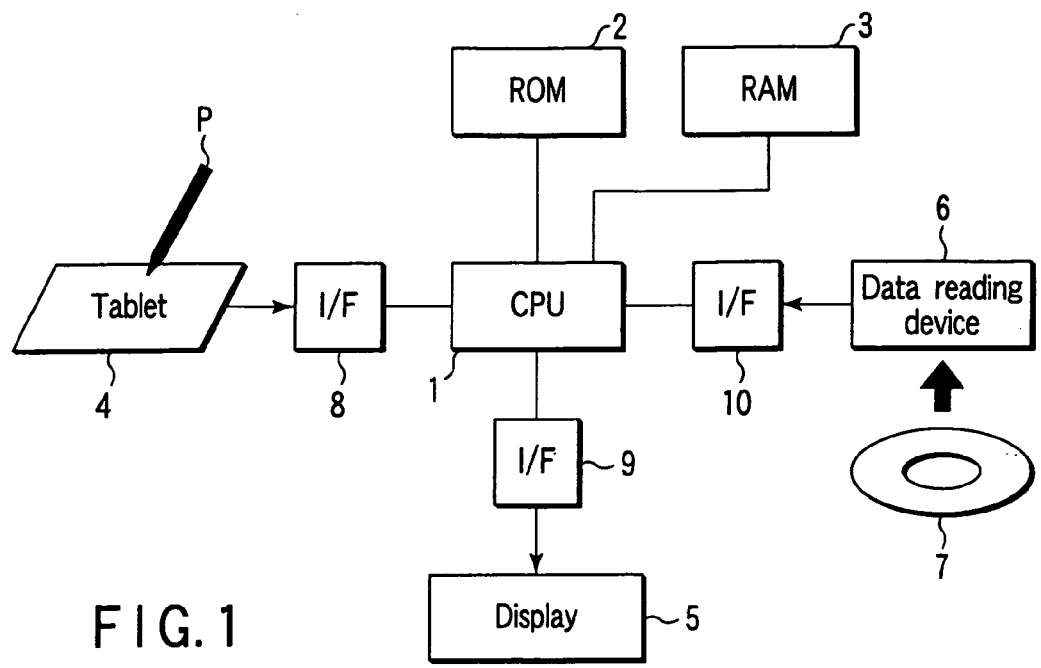
FIG. 1 is a block diagram showing a hardware configuration of an information processing apparatus for realizing a handwriting recognition apparatus according to one embodiment of the present invention.

FIG. 1 shows a hardware configuration of an information processing apparatus that realizes a handwriting recognition apparatus according to one embodiment of the present invention.

The information processing apparatus of FIG. 1 is a small-sized an information processing apparatus such as a mobile information terminal or palmtop computer device, and is configured by a CPU 1, a ROM 2, a RAM 3, a tablet (tablet device or a digitizer pad)) 4, a display (display device) 5, a data reading device 6, storage medium 7, interfaces (I/F) 8, 9, 10, and the like.

The CPU 1 forms a center of the information processing apparatus of FIG. 1, and is an operation/control device for performing an operation for various data processing and a control of a whole system.

The ROM 2 is a nonvolatile memory (storage medium) in which basic software, and the like are stored beforehand, and the RAM 3 is a volatile memory utilized in an operation area, and the like of the CPU 1.

The tablet 4 is a coordinate input device that can input handwriting data, and the display 5 is a display device such as a liquid crystal display for displaying various information items.

The storage medium 7 is a storage device readable by a computer, such as a hard disk, floppy disk, CD-ROM, and optical disc. Data and program are stored in the storage medium 7. The data reading device 6 is a data reading device which can read the data and program stored in the storage medium 7, such as a hard disk drive, floppy disk drive, CD-ROM drive, and optical disc drive.

The interfaces 8, 9, 10 configure the interfaces of the tablet 4, display 5, and data reading device 6, respectively.

A handwriting recognition program for performing handwriting recognition of input handwriting is stored beforehand as the program in the storage medium 7. The handwriting recognition program is read by the data reading device 6 and stored in the RAM 3 at a time of start of the apparatus. The CPU 1 performs a handwriting recognition processing of the input handwriting in accordance with the handwriting recognition program stored in the RAM 3.

Additionally, the handwriting recognition program may be stored beforehand in the ROM 2. In this case, the CPU 1 may perform the handwriting recognition processing of the input handwriting in accordance with the handwriting recognition program in the ROM. Moreover, at the time of start of the apparatus, the ROM 2 may transfer the handwriting recognition program to the RAM 3, and the handwriting recognition processing of input handwriting may be performed in accordance with the handwriting recognition program in the RAM 3. Furthermore, the handwriting recognition program may also be downloaded via a communication line.

The tablet 4 is, for example, transparent, and is disposed on/over a display screen of the display 5. A handwriting input area 301 (see FIG. 5) is disposed in an input area of the tablet 4. When a user utilizes a pen P to write a character in the handwriting input area, handwriting data (time series information of a coordinate value) is detected by the tablet device 4, and transferred to the CPU 1 via the interface 8.

Figure 2:
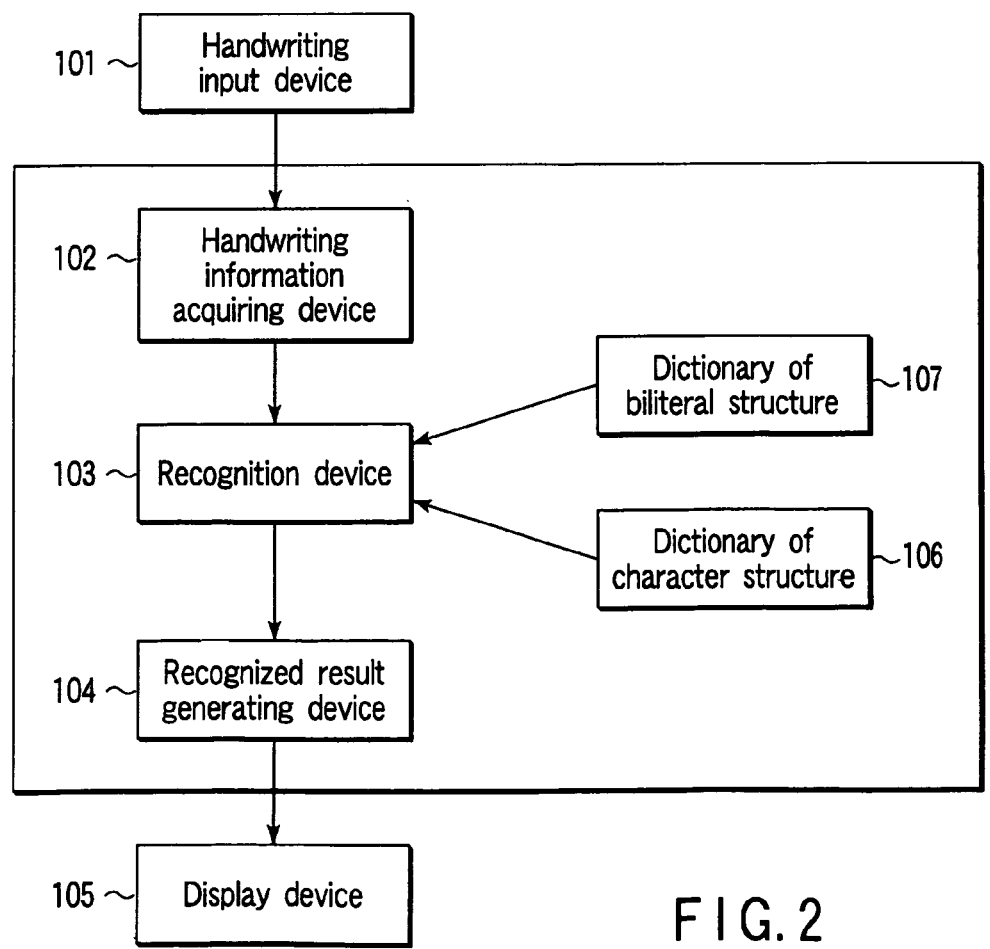
FIG. 2 is a block diagram showing a function configuration of the handwriting recognition apparatus according to one embodiment of the present invention.

FIG. 2 is a block diagram showing a function configuration of the handwriting recognition apparatus realized by the information processing apparatus of FIG. 1.

The handwriting recognition apparatus is configured by respective function devices such as a handwriting input device 101 corresponding to the tablet 4 in FIG. 1, a handwriting information acquiring device 102, a recognition device 103, and a recognized result generating device 104, respective dictionaries such as a dictionary of character structure 106 and dictionary of biliteral structure 107, and a display device 105 corresponding to the display 5 in FIG. 1.

The handwriting information acquiring device 102, recognition device 103, and recognized result generating device 104 are realized, when the CPU 1 in FIG. 1 reads and executes the handwriting recognition program stored in the RAM 3. During the handwriting recognition processing, various generated (prepared) data are temporarily stored, for example, on the RAM 3.

The dictionary of character structure 106 and dictionary of biliteral structure 107 are stored beforehand in the storage medium 7 in FIG. 1 together with the handwriting recognition program, and stored in the RAM 3, when the program is read by the data reading device 6 and stored in the RAM 3. Additionally, it is also possible to store the dictionary of character structure 106 and dictionary of biliteral structure 107 beforehand in the ROM 2.

The handwriting input device 101 is, for example, a tablet, and samples two-dimensional coordinate data. The two-dimensional coordinate data indicate positions of a pen point during contact of the pen P with the tablet (handwriting input area) at a predetermined time interval. The obtained coordinate data are transmitted to the handwriting information acquiring device 102.

The handwriting information acquiring device 102 treats the coordinate data obtained by the handwriting input device 101 from when the pen P contacts the tablet until the pen is detached from the tablet, as one set of data. The one set of coordinate data indicates a stroke (stroke data) and is called a coordinate data string. The handwriting is configured by one or more strokes. The stroke (the stroke data) is represented as coordinate data string Every time the handwriting information acquiring device 102 acquires one stroke (stroke data), the data is transmitted to the recognition device 103.

Every time one stroke is inputted, the recognition device 103 uses the dictionary of character structure 106 and dictionary of biliteral structure 107 to recognize an optimum character string based on presently inputted strokes (stroke data).

The dictionary of character structure 106 is a dictionary in which a plurality of character structure data items corresponding to a plurality of characters respectively are registered. Each of the characters is configured by at least one stroke. Each of the character structure data items indicates shape of one or more strokes configuring a character and positional relation between or among strokes configuring the character when the character is configured by a plurality of strokes.

The dictionary of biliteral structure 107 is a dictionary in which a plurality of biliteral structure data items are registered. Each of the biliteral structure data items indicates structural relation between two characters that are written successively and registered in the dictionary of character structure 106. The structural relation between the two characters indicates positional relations between one or more strokes configuring the one of the two characters and one or more strokes configuring the other when the two characters are written successively.

In the tablet, two successive (consecutive) characters are written side by side in some cases, and one character is written over the other character (or two characters are written successively such that one of the two characters is superimposed on the other) in other cases (e.g., the size of the handwriting input area for writing the character with the pen is only for one character). In the former case, each of the biliteral structure data items indicates structural relation between two characters which are written side by side, the structural relation between the two characters indicating positional relations between one or more strokes configuring the one of the two characters and one or more strokes configuring the other when the two characters are written side by side. In the latter case, each of the biliteral structure data items indicates structural relation between two characters which are written successively such that one of the two characters is superimposed on the other, the structural relation between the two characters indicating positional relation between one or more strokes configuring the one of the two characters and one or more strokes configuring the other when the two characters are superimposed on each other.

The recognition device 103 uses the dictionary of character structure 106 and dictionary of biliteral structure 107 to obtain a most probable and optimum character string based on the shape of the presently inputted strokes and the positional relation between the inputted strokes, every time one stroke is inputted.

The recognized result generating device 104 outputs the optimum character string obtained by the recognition device 103 to the display device 105.

Additionally, for the handwriting input area of the tablet, the handwriting input area is large enough so that a plurality of characters is written side by side in some cases, and the handwriting input area is so small that only one character is written in other cases. In any case, the embodiment can be applied. The cases are different from each other only in the biliteral structure data registerd in the dictionary of biliteral structure.

Figure 3:
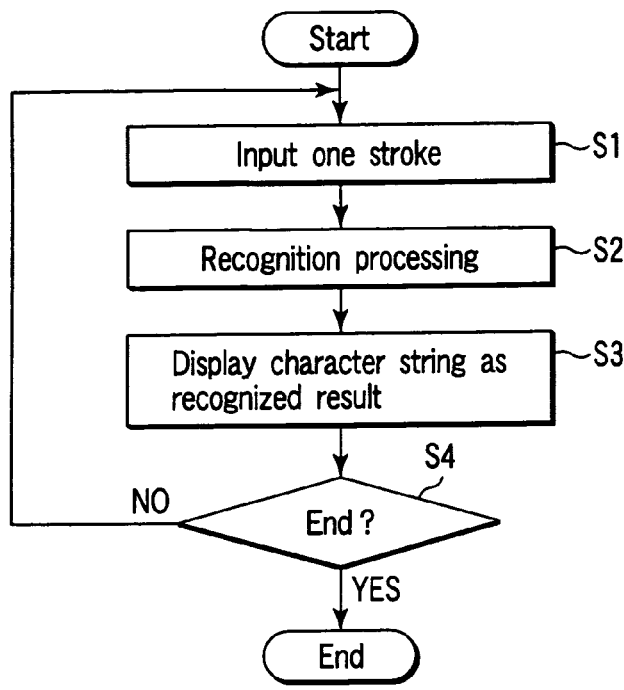
FIG. 3 is a flowchart showing a procedure of a whole character recognition processing in the handwriting recognition apparatus of FIG. 2.

A procedure of a handwriting recognition processing in the handwriting recognition apparatus configured as shown in FIG. 2 will next be described with reference to a flowchart of FIG. 3.

In step S1, when one stroke is written in the handwriting input area, the coordinate data string of the stroke, that is, stroke data is acquired by the handwriting information acquiring device 102 and transmitted to the recognition device 103.

In step S2, the recognition device 103 uses the dictionary of character structure 106 and dictionary of biliteral structure 107 to recognize the optimum character string from the presently inputted strokes (stroke data). For example, by the recognition processing, a determined character by which the character string can be determined to be surely written among the presently inputted strokes, a most probable character (indeterminate character), and a stroke of a character being written (indeterminate stroke) can be estimated.

In step S3, the recognized result generating device 104 displays the optimum character string recognized by the recognition device 103 (e.g., the determined character string and indeterminate character string) in the display device 105.

The aforementioned steps S1 to S3 are repeated until the input of the stroke ends, or until all the presently inputted strokes are estimated as the determined character string (step S4). Thereby, when the user simply continuously writes the character in the handwriting input device 101 without being conscious of an end of the character, the handwriting can automatically be recognized as the character string in the handwriting recognition apparatus of FIG. 2.

Figure 4:
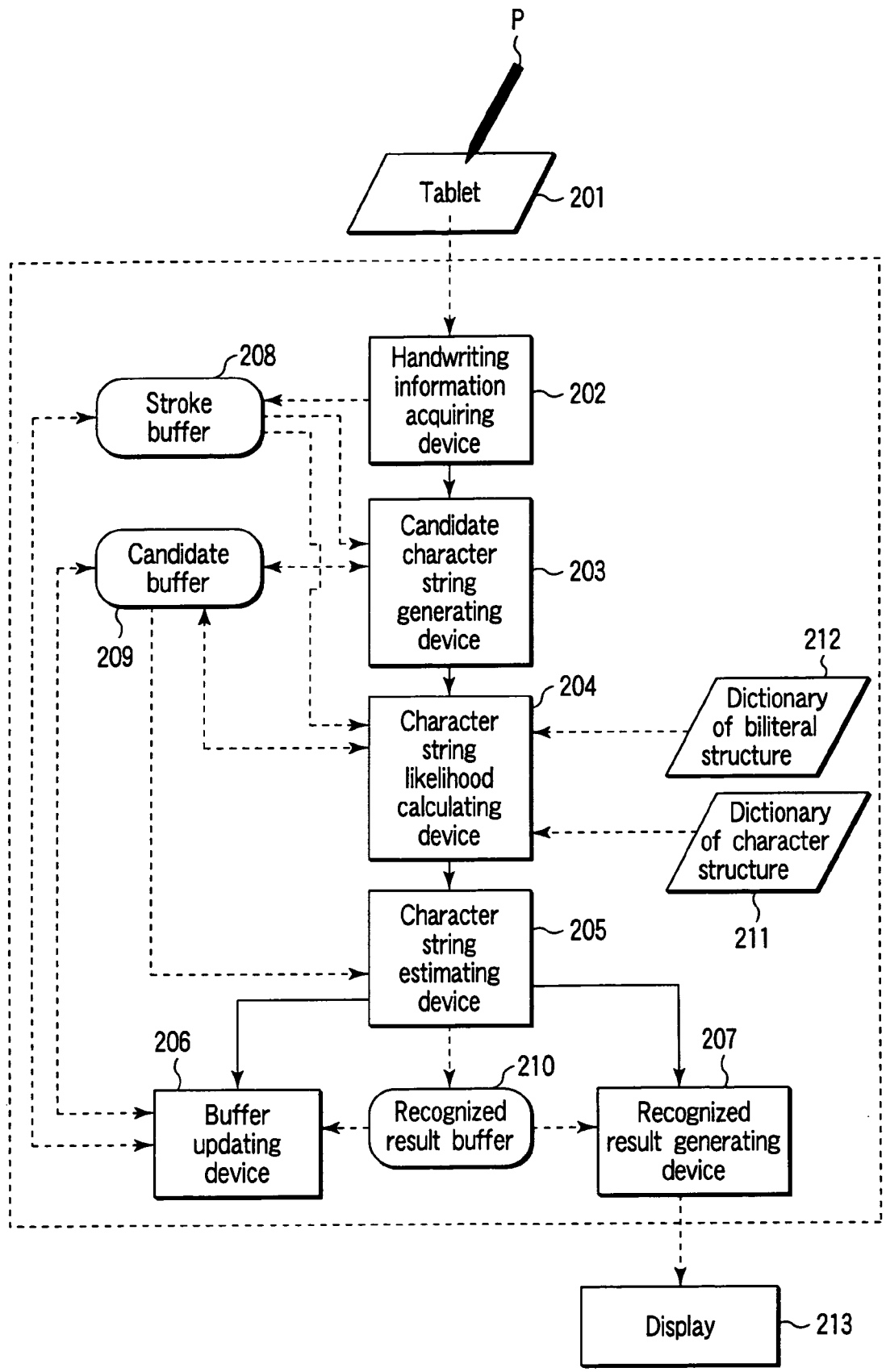
FIG. 4 is a block diagram showing a further detailed function configuration of the handwriting recognition apparatus realized by the information processing apparatus of FIG. 1.

FIG. 4 is a block diagram showing the function configuration of the handwriting recognition apparatus realized by the information processing apparatus of FIG. 1 in more detail.

The handwriting recognition apparatus is configured by respective function devices such as a tablet 201 corresponding to the tablet 4 in FIG. 1, a handwriting information acquiring device 202, a candidate character string generating device 203, a character string likelihood calculating device 204, a character string estimating device 205, a buffer updating device 206, and a recognized result generating device 207, respective buffers such as a stroke buffer 208, a candidate buffer 209, and a recognized result buffer 210, respective dictionaries such as a dictionary of character structure 211 and a dictionary of biliteral structure 212, and a display device 213 corresponding to the display 5 in FIG. 1.

The handwriting information acquiring device 202, candidate character string generating device 203, character string likelihood calculating device 204, character string estimating device 205, buffer updating device 206, and recognized result generating device 207 are realized, when the CPU 1 in FIG. 1 reads and executes the character recognition program stored in the RAM 3.

The stroke buffer 208, candidate buffer 209, and recognized result buffer 210 are secured, for example, on the RAM 3.

The dictionary of character structure 211 and dictionary of biliteral structure 212 are stored beforehand, for example, in the storage medium 7 in FIG. 1 together with the handwriting recognition program, and are stored in the RAM 3, when the program is read by the data reading device 6 and stored in the RAM 3. Additionally, the dictionary of character structure 211 and dictionary of biliteral structure 212 may also be stored beforehand in the ROM 2.

The handwriting information acquiring device 202 of FIG. 4 corresponds to the handwriting information acquiring device 102 of FIG. 2. The candidate character string generating device 203, character string likelihood calculating device 204, character string estimating device 205, and buffer updating device 206 of FIG. 4 correspond to the recognition device 103 of FIG. 3. The recognized result generating device 207 of FIG. 4 corresponds to the recognized result generating device 104 of FIG. 2. Moreover, the dictionary of character structure 211 of FIG. 4 corresponds to the dictionary of character structure 106 of FIG. 2, and the dictionary of biliteral structure 212 of FIG. 4 corresponds to the dictionary of biliteral structure 107 of FIG. 2.

The tablet 201 samples two-dimensional coordinate data. The two-dimensional coordinate data indicate positions of a pen point during contact of the pen P with the tablet 201 (handwriting input area) at a predetermined time interval. The obtained coordinate data are transmitted to the handwriting information acquiring device 202.

The handwriting information acquiring device 202 treats the coordinate data obtained by the handwriting input device 201 from when the pen P contacts the tablet until the pen is detached from the tablet, as one set of data. The one set of coordinate data indicates a stroke (stroke data) and is called a coordinate data string. The handwriting is configured by one or more strokes. The stroke (the stroke data) is represented as coordinate data string Every time the handwriting information acquiring device 102 acquires one stroke (stroke data), the handwriting information acquiring device 202 stores the data in the stroke buffer 208.

The candidate character string generating device 203 generates candidate character strings as candidates for the strokes (stroke data) in the stroke buffer 208, and stores the candidate character strings in the candidate buffer 209.

The character string likelihood calculating device 204 generates a dictionary (dictionary of character string structure) for collation from the dictionary of character structure 211 and dictionary of biliteral structure 212 with respect to the respective candidate character strings in the candidate buffer 209, and collates the dictionary of character string structure with the strokes in the stroke buffer 208.

The character string likelihood calculating device 204 acquires each probability (likelihood) that the strokes in the stroke buffer 208 is each of the candidate character string, and a character segmenting result indicating correspondence between the stroke in the stroke buffer 208 and the character of each candidate character string as collation results of the strokes in the stroke buffer 208 and candidate character strings. The character string likelihood calculating device 204 stores each collation result such that each collation result associates with each candidate character string corresponding to the collation result, in the candidate buffer 209.

The character string estimating device 205 obtains the determined character string, indeterminate character string, and indeterminate stroke string from the candidate character string and the collation result in the candidate buffer 209, and stores these in the recognized result buffer 210. The determined character string is a character string that can be determined to be inputted (written on the handwriting input area) or constituted of the strokes in the stroke buffer 208. The indeterminate character string is a character string that cannot be determined but can be estimated to be inputted (written on the handwriting input area) or constituted of the stroke (or the strokes) in the stroke buffer 208. The indeterminate stroke string is one or more strokes that stored in the stroke buffer 208 and estimated to be the strokes of one character presently writing.

The recognized result generating device 207 outputs the determined character string, indeterminate character string, and indeterminate stroke string in the recognized result buffer 210 to the display device 213.

The buffer updating device 206 deletes the information of a portion corresponding to the determined character string from the stroke buffer 208 and candidate buffer 209 based on the information in the recognized result buffer 210.

Figure 5:
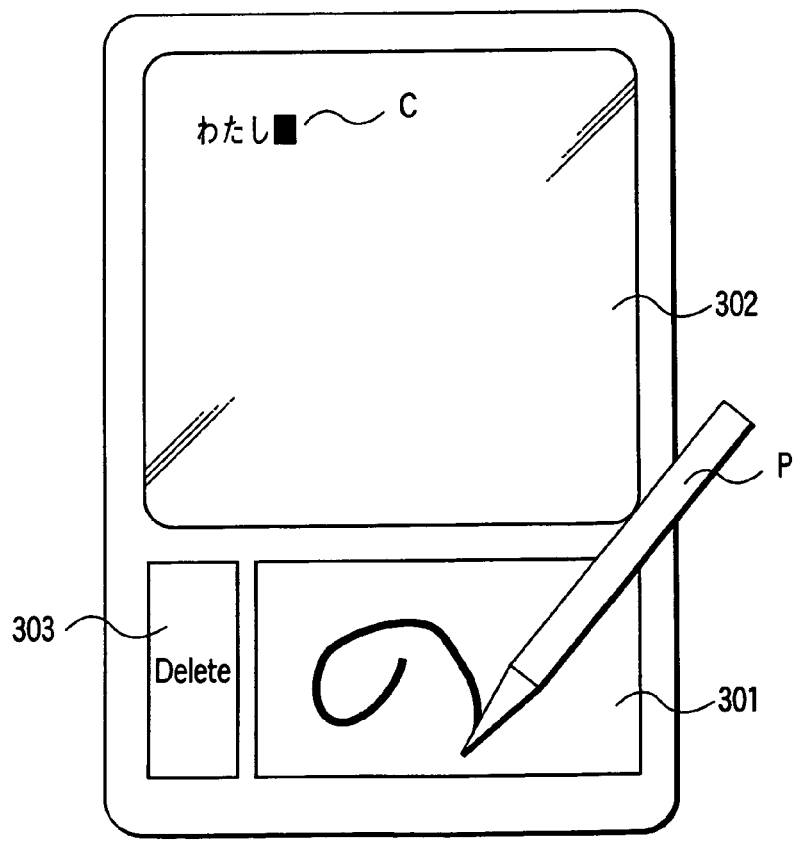
FIG. 5 is a diagram showing an appearance of the information processing apparatus of FIG. 1.

FIG. 5 shows an appearance of the information processing apparatus of FIG. 1.

As shown in FIG. 5, a handwriting input area 301 for writing the character in the tablet 4 (201) with the pen P by the user, a recognized result display area 302 for displaying a result of recognition of handwriting in the handwriting input area 301 as the character string and a cursor C indicating a character insertion position, and a deletion button 303 for instructing deletion of the character immediately before the cursor position are secured in a surface of the information processing apparatus of FIG. 1, the surface constituted by laminating the transparent tablet 4 (201) on the display screen of the display 5 (213).

FIG. 6 shows a data structure example of the stroke buffer 208 in FIG. 4.

The information of the strokes stored in the stroke buffer 208 is constituted of NSTRK indicating the number of strokes (stroke number) in the buffer 208, and NSTRK pieces of stroke data. I-th stroke data (I=1 to NSTRK) is constituted of constituting coordinate point number (indicating the number of coordinate points) NPOINT[I], and NPOINT[I] pieces of x, y coordinate data. Here, the x, y coordinate data of a J-th point (J=1 to NPOINT[I]) of the I-th stroke data is represented by x[I][J], y[I][J].

Figure 7:
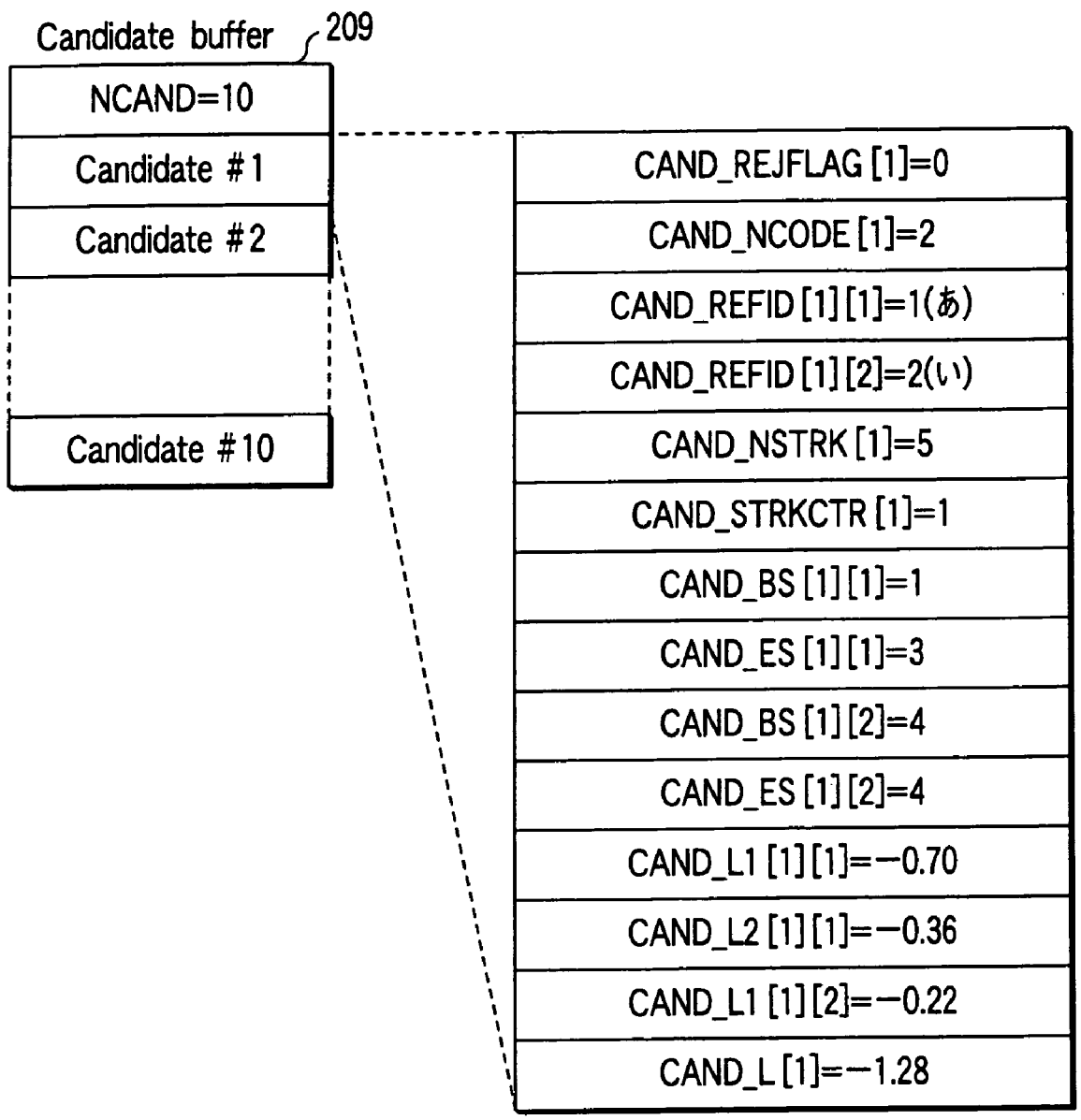
FIG. 7 is a diagram showing a data structure example of a candidate buffer 209 in FIG. 4.

FIG. 7 shows a data structure example of the candidate buffer 209.

The candidate buffer 209 is used to store the character string as a candidate and the collation result with respect to the strokes in the stroke buffer 208. In the embodiment, the information (candidate information) stored in the candidate buffer 209 is constituted of NCAND indicating the number of candidates (candidate character strings) and NCAND candidates (candidate data).

Data of candidate #I, that is, I-th candidate (I=1 to NCAND) includes a character segmenting result. The character segmenting result is constituted of a rejection flag CAND_REJFLAG[I], CAND_NCODE[I], CAND_REFID[I][J], CAND_NSTRK[I], CAND_STRKCTR[I], CAND_BS[I][J], CAND_ES[I][J].

The rejection flag CAND_REJFLAG[I] indicates whether the I-th candidate is a rejection object. CAND_NCODE[I] indicates the number of characters of the character string constituting the candidate (candidate character string). CAND_REFID[I][J] indicates an entry number of each of CAND_NCODE[I] characters (J-th character (J=1 to CAND_NCODE[I])) in the dictionary of character structure 211. CAND_NSTRK[I] indicates the total number of strokes of the candidate character string. CAND_STRKCTR[I] indicates the number of strokes in the stroke buffer 208 corresponding to the last character of the candidate character string. CAND_BS[I][J] indicates a start stroke number of the stroke in the stroke buffer 208 corresponding to each of CAND_NCODE[I] characters (J-th character). CAND_ES[I][J] indicates a end stroke number of the stroke in the stroke buffer 208 corresponding to each of CAND_NCODE[I] characters (J-th character).

The data of the I-th candidate (I=1 to NCAND) is constituted of the character segmenting result and CAND_L1[I][J], CAND_L2[I][J], and CAND_L[I], the values of likelihood corresponding to the I-th candidate.

CAND_L1[I][J] indicates a logarithm value of likelihood (logarithm likelihood) of a result of collation of the dictionary of character structure 211 of CAND_NCODE[I] characters (J-th character) with the corresponding one or more strokes in the stroke buffer 208. CAND_L2[I][J] indicates a logarithm likelihood of a result of collation of the dictionary of biliteral structure 212 between the J-th character and the (J+1)-th character with the corresponding structure characteristic between the strokes (structure characteristic between the last stroke of the J-th character and the first stroke of the (J+1)-th character). CAND_L[I] indicates a sum of the logarithm likelihood mentioned above. the logarithm likelihood CAND_L [I] indicates a result of collation of the character string of the I-th candidate with the whole strokes in the stroke buffer 208.

In the example of FIG. 7, for the candidates in the candidate buffer 209 (candidate character string), there are ten candidates, that is, a first candidate (candidate #1) to a tenth candidate (candidate #10). For the first candidate, the rejection flag is set to "0", and the candidate character string is a character string "あい"(Japanese syllable or hiragana) which has a length of two characters and which is constituted of a first entry "あ"and second entry "い"of the dictionary of character structure 211. The total stroke number of the candidate character string is five. Here, the first stroke of the last character "い"of the candidate character string "あい"is inputted and the collation result is stored. Three strokes, that is, the first to third strokes correspond to the first character "あ"of the candidate character string "あい"Only the fourth stroke corresponds to the second character "い"of the candidate character string "あい"That is, one left-side stroke of "い"is inputted.

As a result of collation of the dictionary of character structure 211 of the first character "あ"of the candidate character string "あい"with the first to third strokes in the stroke buffer 208, the logarithm value of likelihood (logarithm likelihood) is "−0.70". As a result of collation of the dictionary of biliteral structure 212 between "あ"and "い"with the structure between the third stroke (the last stroke of "あ"and the fourth stroke (the first stroke of "い"the logarithm value of likelihood (biliteral logarithm likelihood) is "−0.36". As a result of collation of a top stroke portion in the dictionary of character structure 211 of "い"with the fourth stroke in the stroke buffer 208, the logarithm value of likelihood (logarithm likelihood) is "−0.22". The whole logarithm likelihood obtained by adding the logarithm likelihood of "あ"the biliteral logarithm likelihood between "あ"and "い"and the logarithm likelihood of the first stroke of "い"is "−1.28".

Figure 8:
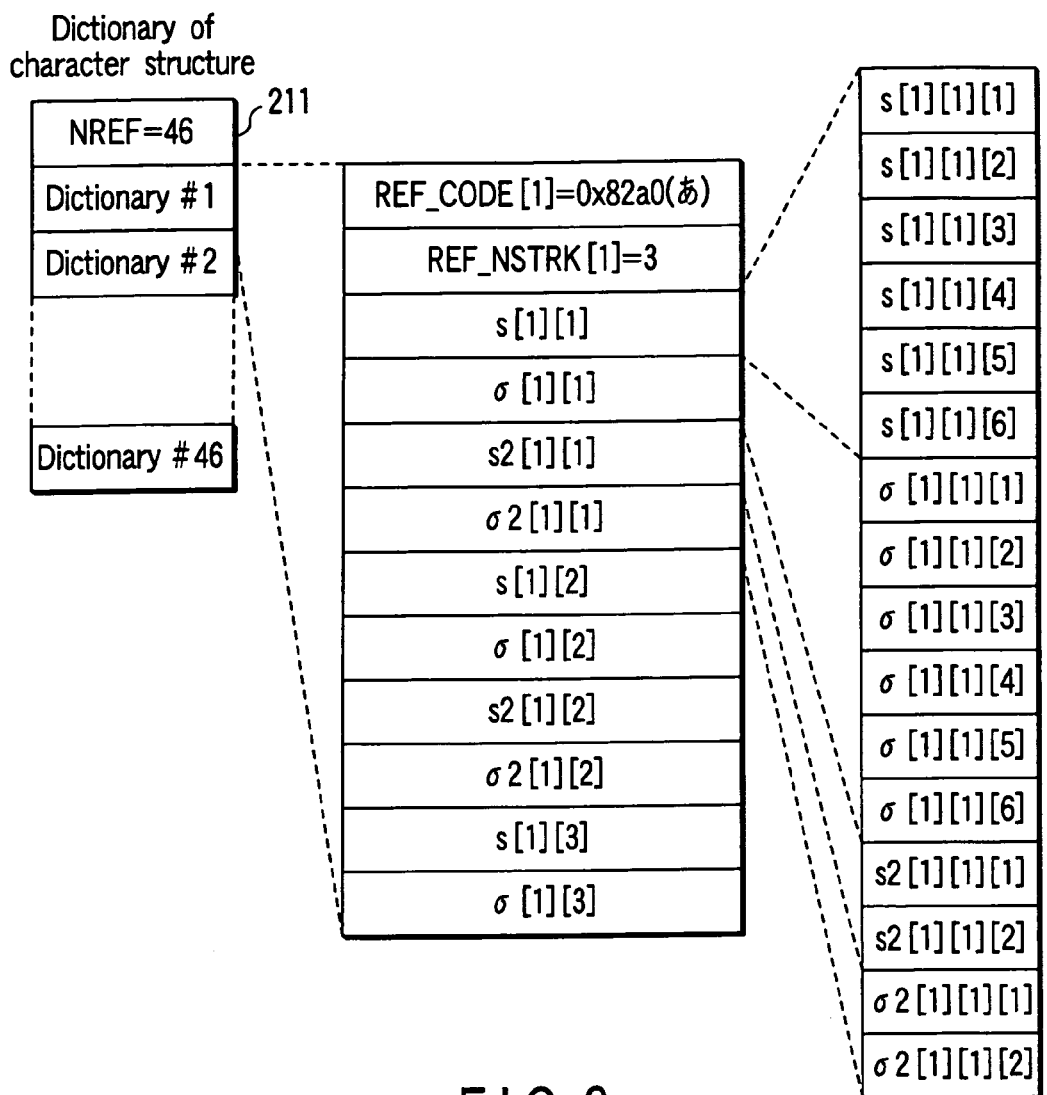
FIG. 8 is a diagram showing a data structure example of a dictionary of character structure 211 in FIG. 4.

FIG. 8 shows a data structure example of the dictionary of character structure 211.

The dictionary of character structure 211 is a dictionary in which a plurality of character structure data items corresponding to a plurality of characters as the recognition objects respectively are registered. The dictionary of character structure 211 is constituted of NREF indicating the number of characters as the recognition objects and the character structure data items, each of the character structure data items corresponds to each of the NREF characters.

The character structure data item (dictionary #I) of the I-th (I=1 to NREF) character is constituted of REF_CODE[I], REF_NSTRK[I], an average vector s[I][J][1 to 6] and covariance vector σ[I][J][1 to 6], an average vector s2[I][J][1 to 2] and covariance vector σ2[I][J][1 to 2]. Here, s[I][J][1 to 6] represents a six-dimensional vector constituted of s[I][J][1], s[I][J][2], ... s[I][J][6]. For σ[I][J][1 to 6], s2[I][J][1 to 2], a2[I][J][1 to 2], the vector is similarly represented.

REF_CODE[I] indicates the character by a code (e.g., SHIFT-JIS code). REF_NSTRK[I] indicates the total number of strokes constituting the character. The average vector s[I][J][1 to 6] indicates the average vector of a shape characteristic as the characteristic of REF_NSTRK[I] strokes (J-th stroke (J=1 to REF_NSTRK[I]). The covariance vector σ[I][J][1 to 6] indicates the covariance vector of a shape characteristic as the characteristic of REF_NSTRK[I] strokes (J-th stroke (J=1 to REF_NSTRK[I]). The average vector s2[I][J][1 to 2] indicates the average vector of a structure characteristic between the (J−1)-th stroke and the J-th stroke. The covariance vector σ2[I][J][1 to 2] indicates the covariance vector of a structure characteristic between the (J−1)-th stroke and the J-th stroke. The stroke shape characteristic and the structure characteristic between the strokes will be described later.

Figure 9:
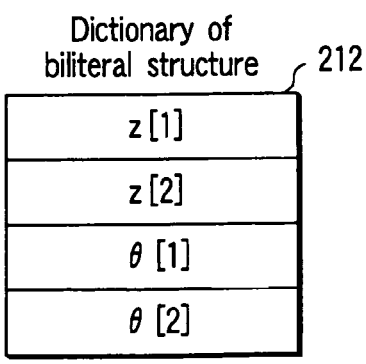
FIG. 9 is a diagram showing a data structure example of a dictionary of biliteral structure 212 in FIG. 4.

FIG. 9 shows a data structure example of the dictionary of biliteral structure 212.

The dictionary of biliteral structure 212 is a dictionary in which a plurality of biliteral structure data items are registered. Each of the biliteral structure data items indicates structural relation between two characters that are a combination of two continuously (or successively) written characters among NREF characters (recognizable characters) registered in the dictionary of character structure 211. In FIG. 9, one of the biliteral structure data items registered in the dictionary of biliteral structure 212, is shown. The biliteral structure data item shown in FIG. 9 indicates the structural relation between two characters. The biliteral structure data item is constituted of an average vector z[1 to 2] and covariance vector θ[1 to 2] of the biliteral structure characteristic (structural relation between the two characters). The bilateral structure characteristic indicates positional relation between the last stroke of the former character and the top (the first) stroke of the latter character.

If two successive (consecutive) characters are written side by side, the structural relation between two characters indicates positional relations between the last stroke of the former character of the two characters and the first stroke of the latter character of the two characters when the two characters are written side by side. If the one character is written over the other character (or two characters are written successively such that one of the two characters is superimposed on the other), the structural relation between two characters indicates positional relations between the last stroke of the former character of the two characters and the first stroke of the latter character of the two characters when the two characters are superimposed on each other.

A procedure of a handwriting recognition processing in the handwriting recognition apparatus configured as described above will next be described with reference to flowcharts of FIGS. 10 to 24.

Figure 10:
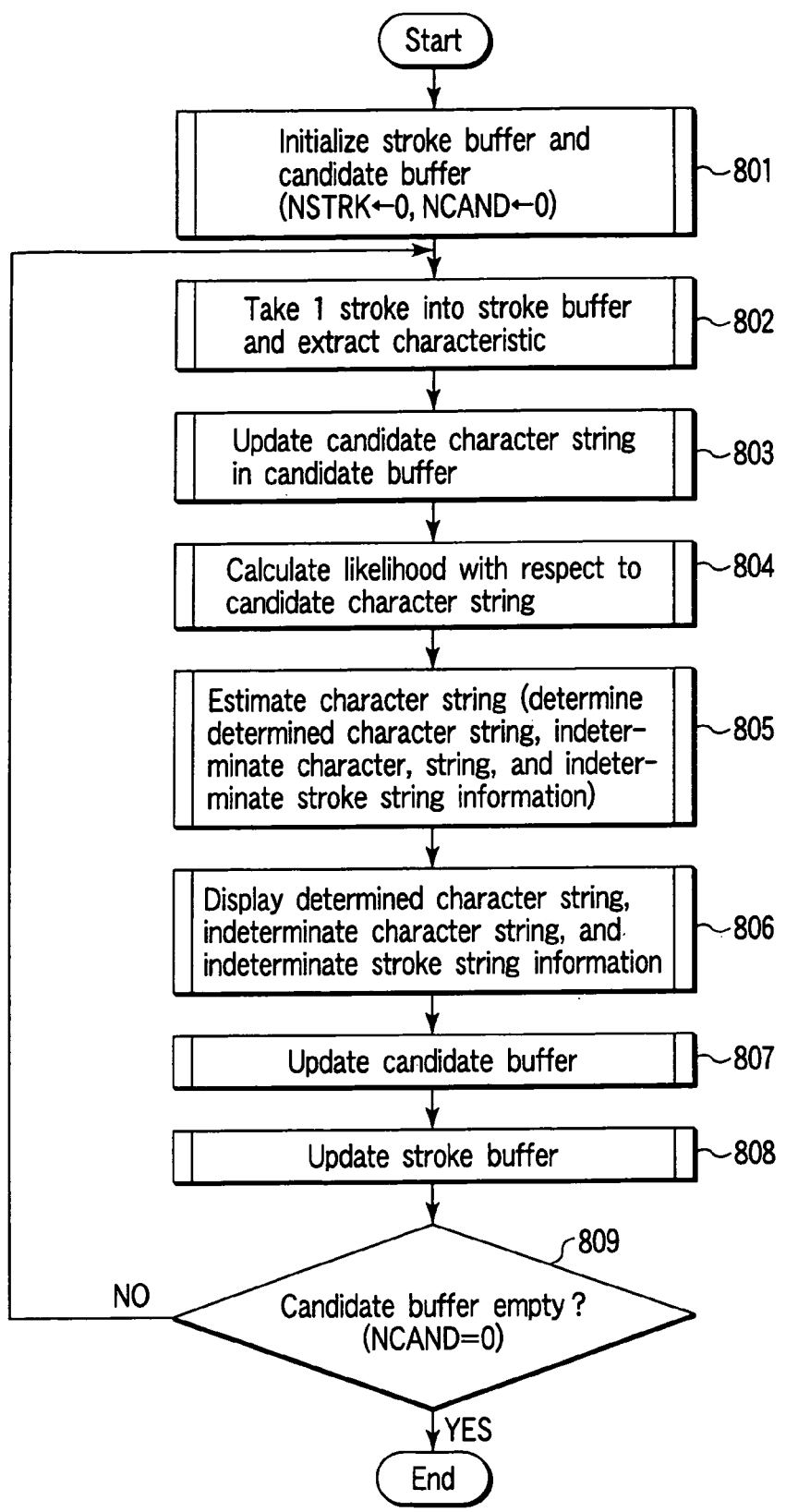
FIG. 10 is a flowchart showing the procedure of the whole handwriting recognition processing in the handwriting recognition apparatus of FIG. 4 realized by the information processing apparatus of FIG. 1.

First, the whole processing will be described with reference to the flowchart of FIG. 10.

Step 801 is a step of initializing the respective buffers in the handwriting recognition apparatus.

In step 802, when one stroke is written in the handwriting input area 301, the coordinate data string of the stroke, that is, the stroke data is stored in the stroke buffer 208 by the handwriting information acquiring device 202, and the characteristic of the stroke is extracted.

In step 803, candidate character string generating device 203 generates the candidate character string based on the strokes stored in the stroke buffer 208 and stored the candidate character string in the candidate buffer 209.

In step 804, the candidate character string in the candidate buffer 209 generated by the step 803 and the strokes stored in the stroke buffer 208 by the step 802 are collated by the character string likelihood calculating device 204, and the probability that the strokes in the stroke buffer 208 are written as the candidate character string is calculated.

In step 805, a determined character string which is configured by characters that can be determined to be surely written, indeterminate character string which is configured by one or more characters that cannot be determined but can be estimated to be written, and indeterminate stroke string are obtained by the character string estimating device 205 based on the collation result and each candidate character string in the step 804.

In step 806, at least a determined character string is displayed in the recognized result display area 302 by the recognized result generating device 207.

In the steps 807, 808, the stroke buffer 208 and candidate buffer 209 are updated by the buffer updating device 206.

The aforementioned steps 802 to 808 are repeated until all input strokes are estimated as determined character strings (the candidate buffer 209 is emptied) (step 809). Thereby, when the user simply continuously writes the character in the handwriting input area 301 without being conscious of the end of the character, the handwriting can automatically be recognized as the character string in the handwriting recognition apparatus of FIG. 4.

A processing content of each step in the flowchart of FIG. 10 will be described hereinafter in detail.

First in the step 801, the stroke buffer 208 and candidate buffer 209 are initialized. Here, the stroke number NSTRK in the stroke buffer 208 having the data structure shown in FIG. 6, and the candidate character string number NCAND in the candidate buffer 209 having the data structure shown in FIG. 7 are set to "0", respectively, and thereby both the buffers 208, 209 are initialized.

The next step 802 is executed every time one stroke is written in the handwriting input area 301 secured on the tablet 201 (disposed on and over the display screen of the display 5) with the pen P by the user. The data (coordinate data string) of the written stroke is acquired by the tablet 201. In the step 802, the data of the stroke acquired by the tablet 201 is taken by the handwriting information acquiring device 202 and stored in the stroke buffer 208. Moreover, in the step 802, a processing for extracting the characteristic of the stroke data (the shape of the stroke indicated by the data) stored in the stroke buffer 208 is performed.

A detail of the processing of the step 802 by the handwriting information acquiring device 202 will be described with reference to the flowchart of FIG. 11.

First, in step 901, the stroke number NSTRK in the stroke buffer 208 of the data structure of FIG. 6 is incremented by one.

In the next steps 902 to 905, x and y coordinate data of the pen point acquired by the tablet 201 are successively taken into the stroke buffer 208 until the pen P is lifted up from the tablet 201. Here, x coordinate and y coordinate of a J-th point of the I-th stroke are set to x[I][J] and y[I][J] in the stroke buffer 208 shown in FIG. 6, respectively.

In step 906, the number of coordinate points (constituting one stroke) taken until the pen P is detached from the tablet 201 is set to NPOINT[I].

In step 907, a stroke shape characteristic vector u[1 to 6] representing the stroke shape is extracted from the latest stroke taken into the stroke buffer 208, that is, NSTRK-th stroke data. Here, u[1 to 6] represents a six-dimensional vector constituted of u[1], u[2], . . . u[6]. For example, six coefficients representing two-dimensional low-band components of a P-type Fourier descriptor obtained by Fourier-developing a complex numeric function having all curvature functions of the stroke data in an index portion of an index function are used as the shape characteristic. A method described in a document "Online Handwritten Chinese Character Recognition characterized by Bend of linear Diagram" (Journal of Society of Electronic Information Communication April 1990, Vol. J73-D-II No. 4 pp. 519 to 525) is used as a procedure for calculating the P-type Fourier descriptor.

When the second and subsequent strokes are inputted, in step 909, a two-dimensional structure characteristic vector between the strokes u2[1 to 2] representing the structural relation (positional relation) between the NSTRK-th stroke and the previously inputted (NSTRK−1)-th stroke is extracted. For example, a vector obtained by normalizing a norm of a vector connecting an end point of the (NSTRK−1)-th stroke to a start point of the NSTRK-th stroke to 1 is used as the structure characteristic.

In the next step 803, the candidate character string generating device 203 updates the candidate character string in the candidate buffer 209. The step 803 is a processing of generating the candidate character string which can be a candidate for the strokes stored in the stroke buffer 208 at this point of time.

Figure 12:
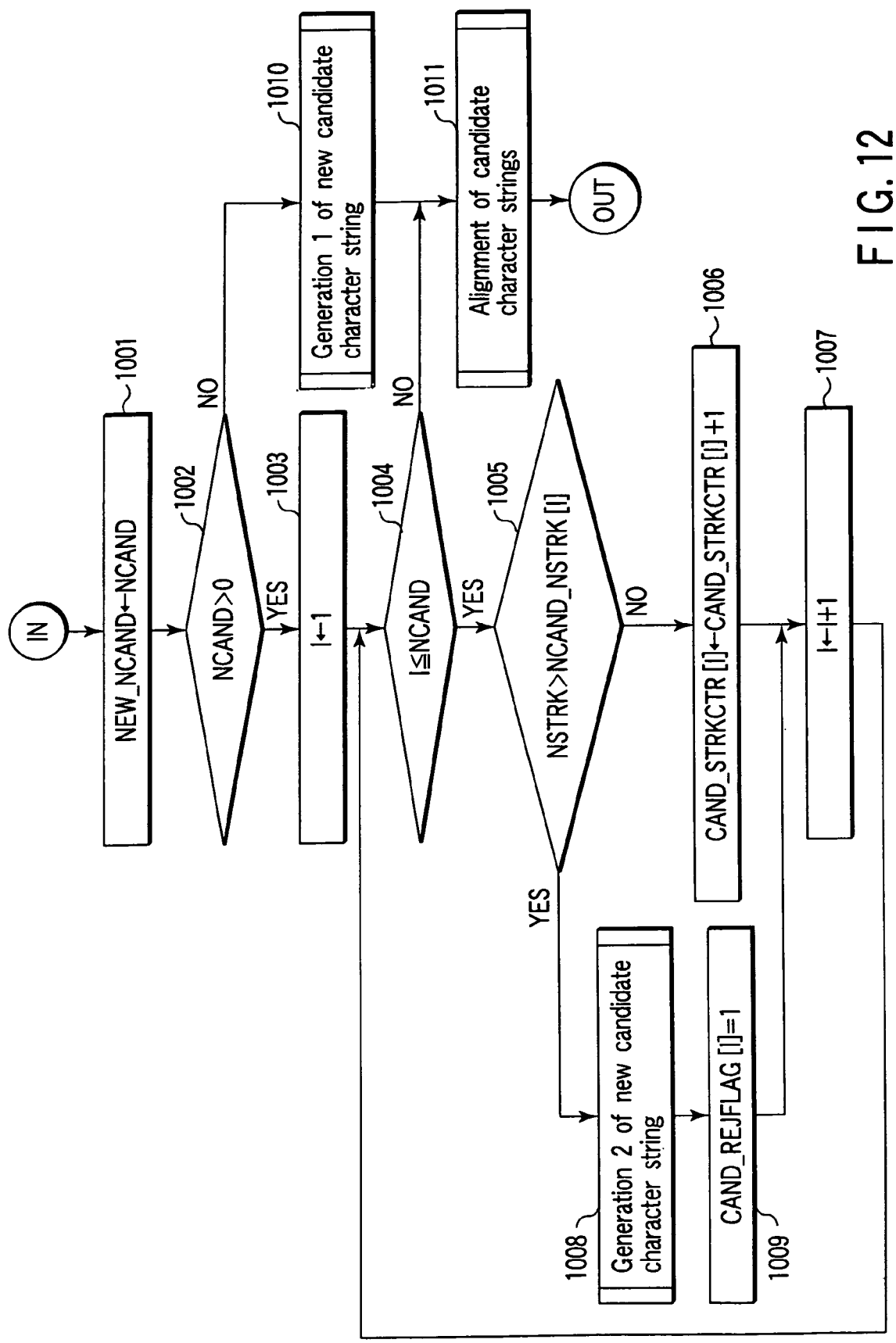
FIG. 12 is a flowchart showing a detailed processing procedure in a step 803 in FIG. 10.

A detail of the processing of the step 803 will be described with reference to the flowchart of FIG. 12.

First, in step 1002, based on NCAND indicating the present number of candidate character strings in the candidate buffer 209, it is judged whether or not there is a candidate character string.

Figure 13:
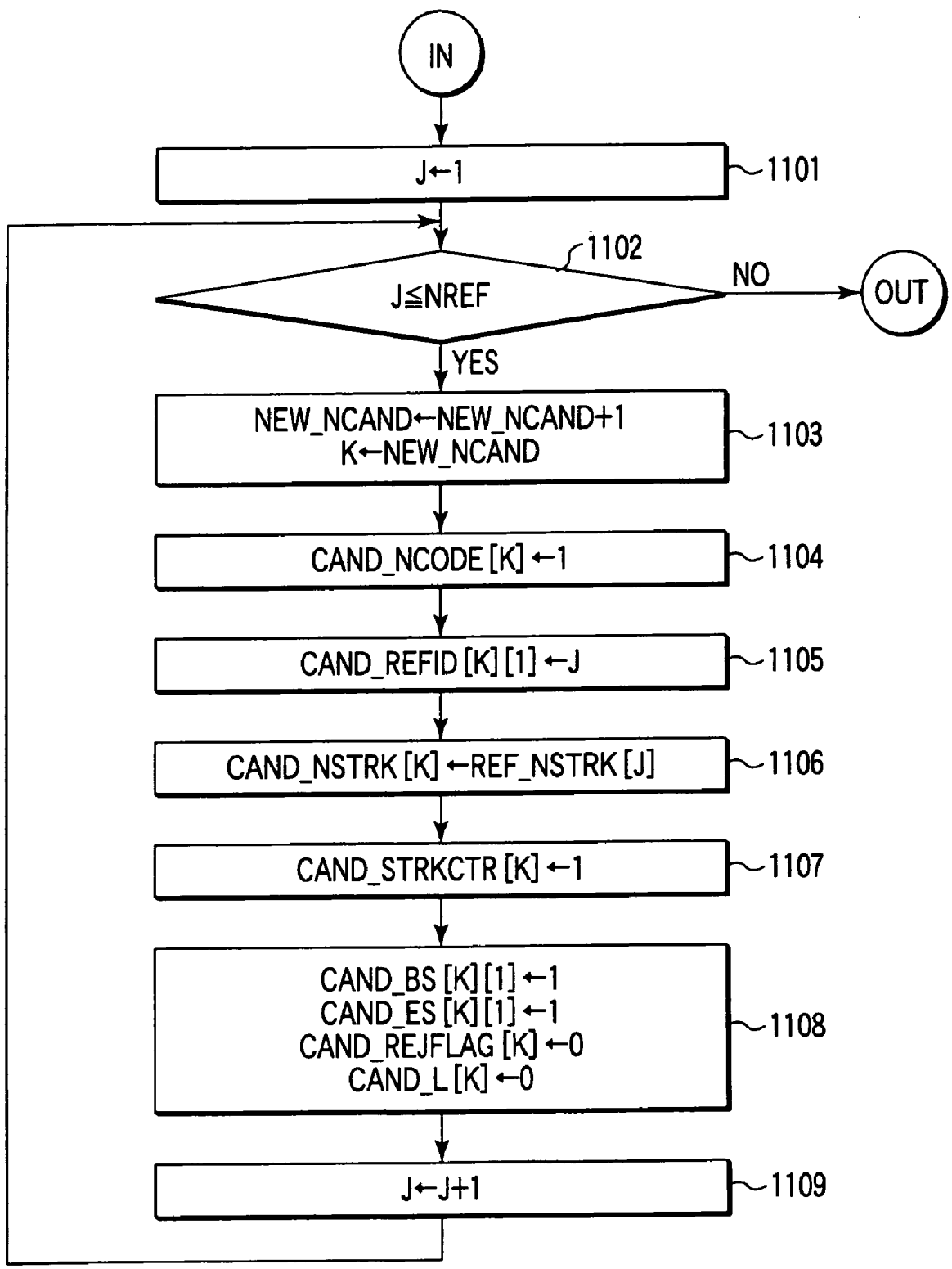
FIG. 13 is a flowchart showing a detailed processing procedure in a step 1010 in FIG. 12.

When the string does not exist (NCAND=0), the flow jumps to step 1010 to perform a processing of storing (generating) each of NREF characters registered in the dictionary of character structure 211 of the data structure shown in FIG. 8 as the I-th candidate character string (new candidate character string) having CAND_NCODE[I] (I=1 to NREF) of "1" in the candidate buffer 209. A detailed processing procedure in the step 1010 is shown in the flowchart of FIG. 13.

On the other hand, when the candidate character string already exists in the candidate buffer 209 (NCAND>0), the I-th candidate character string is subjected to the following processing.

First in step 1005, it is judged whether the stroke just written/inputted is the first stroke of the new one character subsequent to the present I-th candidate character string by judging whether or not the stroke number NSTRK in the stroke buffer 208 exceeds the total stroke number CAND_NSTRK[I] of the I-th candidate character string.

When the stroke is judged not to be the first stroke of the new character, a counter CAND_STRKCTR[I] indicating the number of strokes constituting the last character of the I-th candidate character string is increased by one in step 1006.

Figure 14:
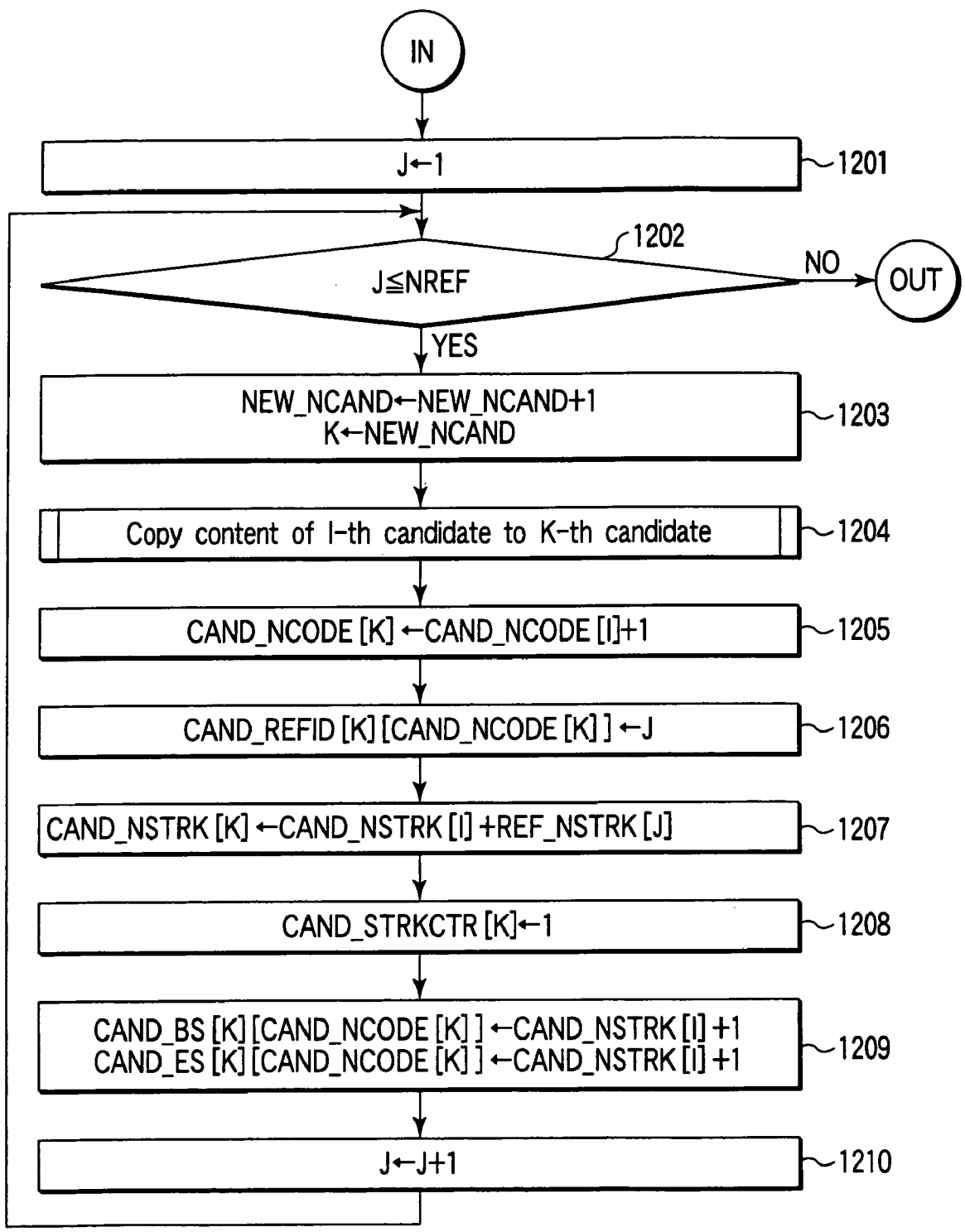
FIG. 14 is a flowchart showing a detailed processing procedure in a step 1008 in FIG. 12.

On the other hand, when the stroke is judged to be the first stroke of the new one character, a processing of adding one character to the present I-th candidate character string to generate a new candidate character string and registering the stroke in the candidate buffer 209 in step 1008. Any one of NREF characters included in the dictionary of character structure 211 is added, and the corresponding number of new K-th candidate character strings (K=1 to NREF) are registered in the candidate buffer 209. A detailed processing procedure in the step 1008 is shown in the flowchart of FIG. 14.

For the present I-th candidate character string, the rejection flag is set as the old candidate character string in step 1009.

Figure 15:
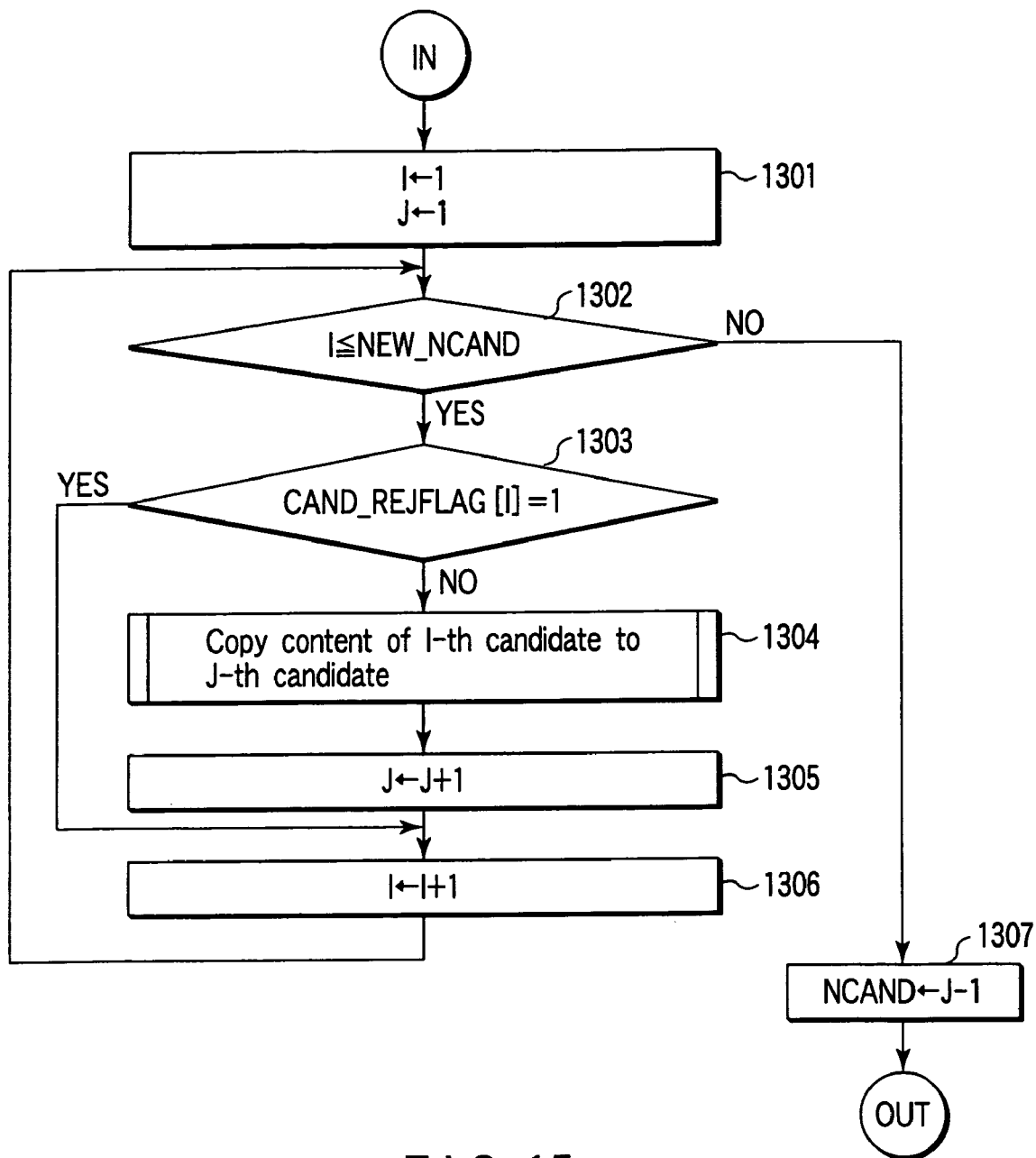
FIG. 15 is a flowchart showing a detailed processing procedure in a step 1011 in FIG. 13.

The NREF new candidate character strings are generated/registered in the candidate buffer 209 with respect to all NCAND candidate character strings in this manner (step 1004). Then, a candidate character string updating processing is performed in step 1011. The process comprises removing the old candidate character string with the rejection flag set therein from the candidate buffer 209 and aligning the new candidate character strings. A detailed processing procedure in the step 1011 is shown in the flowchart of FIG. 15.

The detailed processing procedure in the step 803 has been described above.

Subsequently, in step 804 the collation with the strokes in the stroke buffer 208 is performed by the character string likelihood calculating device 204 with respect to each candidate character string in the candidate buffer 209, and the collation result (likelihood calculation result) is stored in the candidate buffer 209.

Figure 16:
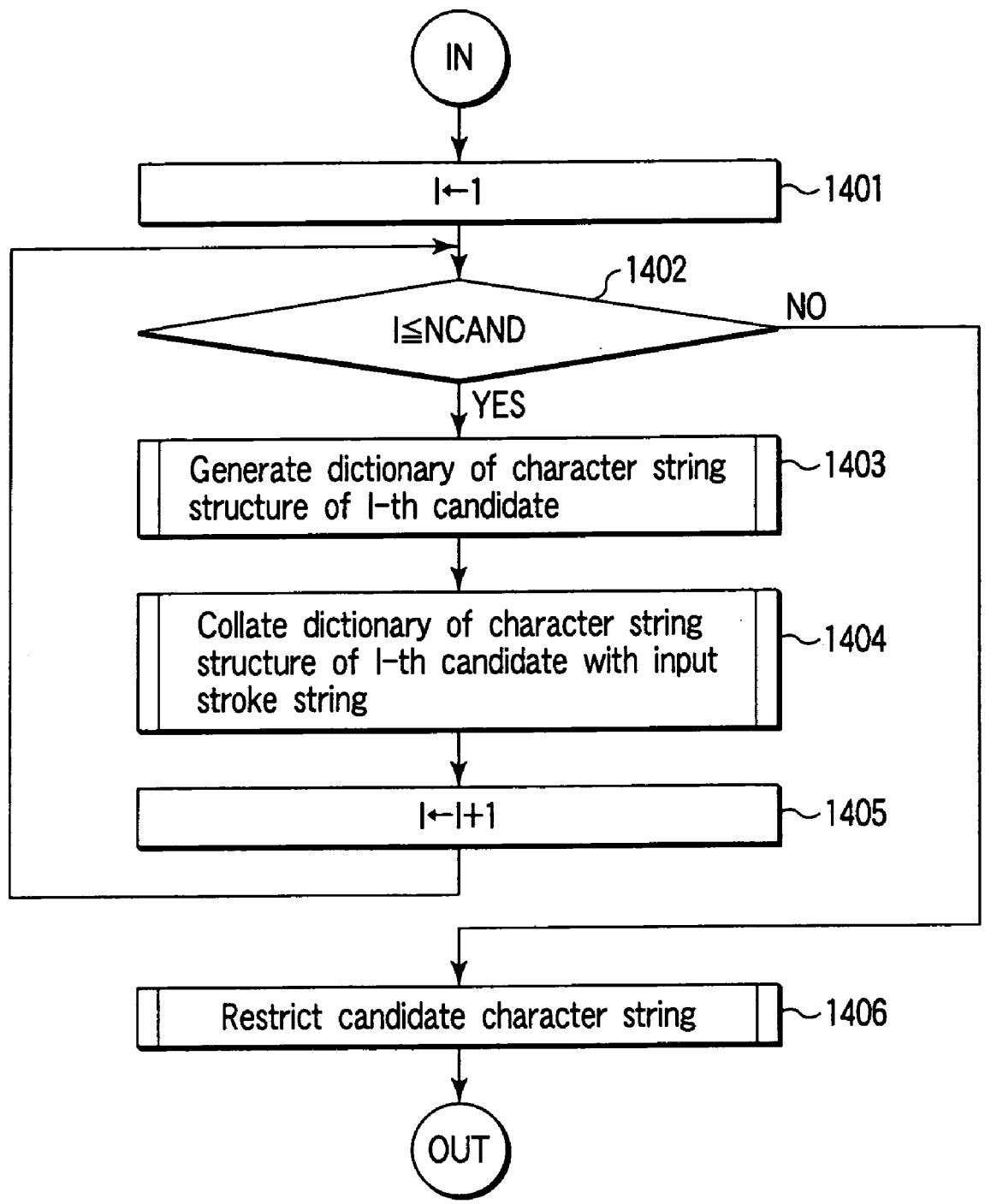
FIG. 16 is a flowchart showing a detailed processing procedure in a step 804 in FIG. 10.

A detail of the processing of the step 804 will be described with reference to the flowchart of FIG. 16.

First, in step 1403, the dictionary of character string structure for use in the collation of the strokes in the stroke buffer 208 is generated with respect to each I-th candidate character string of the candidate buffer 209. In the next step 1404, the strokes in the stroke buffer 208 and the generated dictionary of character string structure are collated.

Figure 17:
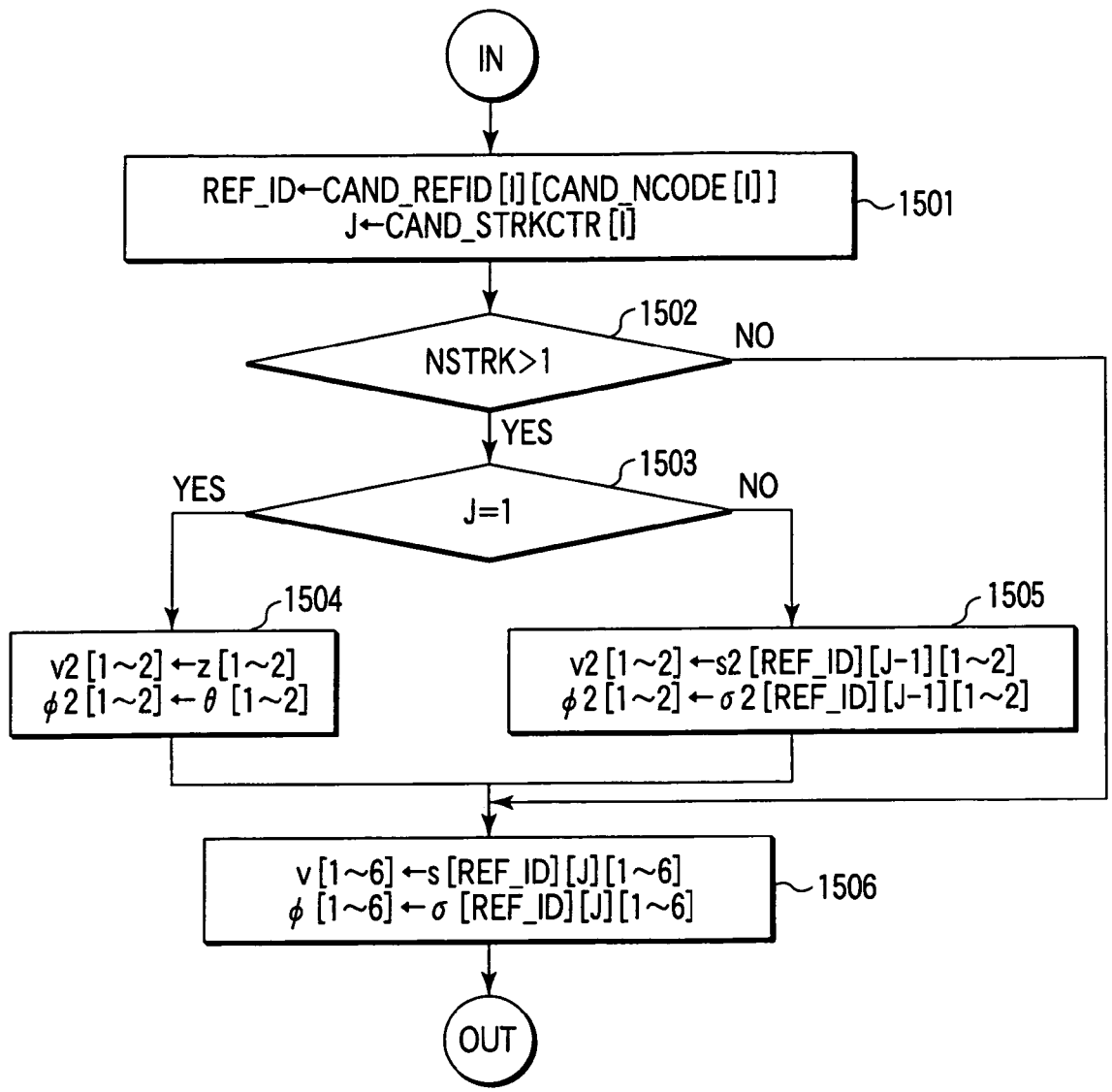
FIG. 17 is a flowchart showing a detailed processing procedure in a step 1403 in FIG. 16.

A processing of generating the dictionary of character string structure of the I-th candidate character string in the step 1403 is performed according to the flowchart of FIG. 17 as follows. First in step 1502, it is judged whether there are two or more strokes in the stroke buffer 208 by judging whether or not the stroke number NSTRK in the buffer 208 is larger than one. When there is only one stroke, the flow jumps to step 1506. When there are two or more strokes, it is judged in step 1503 whether the latest stroke is the first stroke of the last character of the I-th candidate character string.

With the first stroke, it is judged that an interval between the stroke and the previous stroke is an interval (character separation) between the characters. In this case, the biliteral structure data item between the corresponding two characters is extracted from the dictionary of biliteral structure 212 in step 1504. After the average vector z[1 to 2] and covariance vector θ[1 to 2] constituting the biliteral structure data item are set to v2[1 to 2] and φ2[1 to 2], respectively, the flow advances to the step 1506.

On the other hand, when the stroke is not the first stroke, the interval between the stroke and the previous stroke is judged to be an interval between the strokes in the last character of the I-th candidate character string. In step 1505, the average vector and covariance vector of the structure characteristic between the corresponding strokes described in character structure data item in the dictionary of character structure 211 regarding the last character are set to v2[1 to 2] and φ2[1 to 2], respectively, and subsequently the flow advances to the step 1506.

In the step 1506, the average vector and covariance vector of the stroke shape characteristic described in the character structure data item in the dictionary of character structure 211 regarding the last character corresponding to the latest input stroke are set to v[1 to 6] and φ[1 to 6], respectively.

Figure 18:
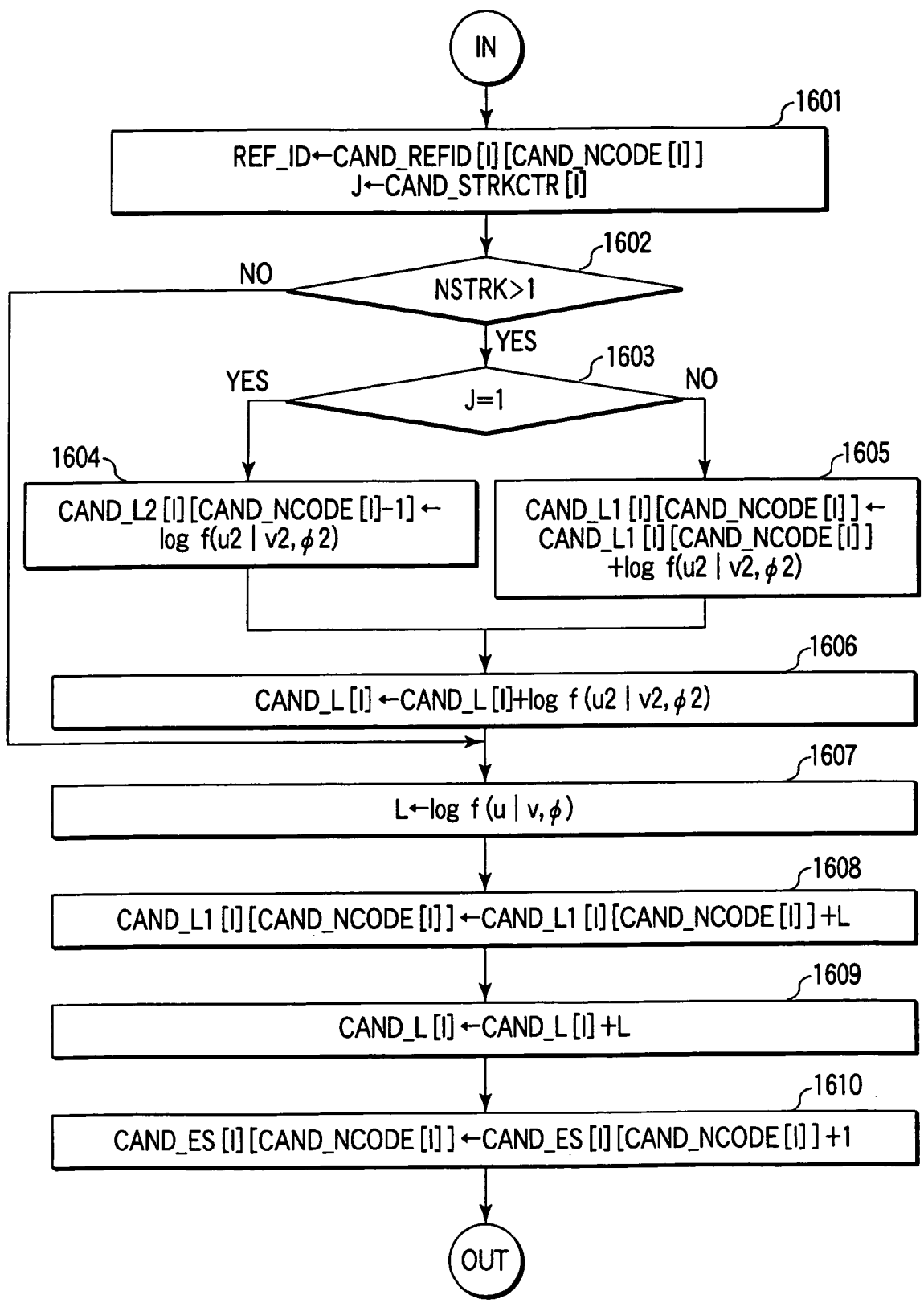
FIG. 18 is a flowchart showing a detailed processing procedure in a step 1404 in FIG. 16.

Subsequently, the collation processing of the dictionary of character string structure of the I-th candidate character string with the strokes in the step 1404 is performed according to the flowchart of FIG. 18 as follows.

First in step 1602, it is judged whether or not there are two or more strokes in the stroke buffer 208 similarly as the step 1502. When there is only one stroke, the flow jumps to step 1607. With two or more strokes, it is judged in step 1603 whether or not the latest stroke is the first stroke of the last character of the present I-th candidate character string.

With the first stroke, the interval between the stroke and the previous stroke is regarded as the interval (character separation) between the characters. In this case, in step 1604, the likelihood is calculated among the structure characteristic vector u2[1 to 2] between the strokes extracted in the step 909 and the average vector v2[1 to 2] and covariance vector φ2[1 to 2] of the biliteral structure characteristic set in the step 1504. The logarithm value log f(u2|v2,φ2) is set as the logarithm likelihood of the corresponding biliteral structure portion of the I-th candidate character string, that is, the biliteral structure portion between the character in which the stroke previous to the latest stroke is the last stroke and the next character (the last character of the present I-th candidate character string). Thereafter, the flow advances to step 1606.

Here, the likelihood is calculated as a probability density function value of the vector u2[1 to 2] in a case a multi-dimensional non-correlated normal distribution having the average vector v2[1 to 2] and covariance vector φ2[1 to 2] is the probability density function, by the following equation (1).

$$f(u2 \mid v2, \phi2) = \prod_{i=1}^{2} \frac{1}{\sqrt{2\pi\phi2[i]^2}} e^{-\frac{1}{2}\sum_{i=1}^{2} \frac{1}{\phi2[i]^2}(u2[i]-v2[i])^2} \quad (1)$$

On the other hand, when the latest stroke is judged not to be the first stroke of the last character of the present I-th candidate character string in the step 1603, the interval between the stroke and the previous stroke is regarded as the interval between the strokes in the last character of the I-th candidate character string. In this case, in step 1605, the likelihood is calculated among the structure characteristic vector u2[1 to 2] between the strokes extracted in the step 909 and the average vector v2[1 to 2] and covariance vector φ2[1 to 2] of the structure characteristic between the strokes set in the step 1505. The logarithm value log f(u2|v2,φ2) is accumulated and set to the logarithm likelihood of the corresponding character structure portion of the I-th candidate character string, that is, the character structure portion of the last character of the present I-th candidate character string. Thereafter, the flow advances to the step 1606. The probability density function having a form similar to that of the step 1604 is used in the calculation of likelihood.

In the step 1606, the logarithm value log f(u2|v2,φ2) of likelihood calculated in the step 1604 or 1605 is accumulated and set to logarithm likelihood CAND_L[I] obtained at this time as a result of collation of the I-th candidate character string with the whole inputted strokes.

In step 1607, the likelihood is calculated among the shape characteristic vector u[1 to 6] of the input stroke extracted in the step 907 and the average vector v[1 to 6] and covariance vector φ[1 to 6] of the corresponding stroke shape characteristic of the dictionary of character structure of the last character of the I-th candidate character string, and the logarithm value log f(u|v,φ) is obtained.

Here, the likelihood is calculated as the probability density function value of the input vector u[1 to 6] in the case the multi-dimensional non-correlated normal distribution having the average vector v[1 to 6] and covariance vector φ[1 to 6] is the probability density function, by the following equation (2).

$$f(u \mid v, \phi) = \prod_{i=1}^{6} \frac{1}{\sqrt{2\pi\phi[i]^2}} e^{-\frac{1}{2}\sum_{i=1}^{6} \frac{1}{\phi[i]^2}(u[i]-v[i])^2} \quad (2)$$

In step 1608, the logarithm value log f(u|v,φ) obtained in the step 1607, that is, the logarithm value log f(u|v,φ) of likelihood obtained by collation of the stroke shape characteristic is accumulated and set to the logarithm likelihood of the corresponding character structure portion of the I-th candidate character string, that is, the character structure portion of the last character of the I-th candidate character string.

In step 1609, the logarithm value log f(u|v,φ) obtained in the step 1607 is accumulated and set to the logarithm likelihood CAND_L[I] obtained as the result of collation of the I-th candidate character string with the whole inputted strokes.

When the collation with the inputted strokes in the stroke buffer 208 is performed with respect to all the candidate character strings in the candidate buffer 209 (step 1405), the candidate character string is restricted in step 1406.

The restriction processing in the step 1406 is executed according to the flowchart of FIG. 19. When a sum of the logarithm likelihood acquired with respect to each I-th candidate character string (I=1 to NCAND) in the candidate buffer 209, that is, the logarithm likelihood CAND_L[I] of the result of collation of the I-th candidate character string with the whole input strokes is less than a predetermined threshold value α, a possibility that the candidate character string is inputted is judged to be low (step 1703). In this case, the candidate character string is deleted from the candidate buffer 209.

On the other hand, for the candidate character string whose logarithm likelihood CAND_L[I] is not less than the threshold value α, the possibility that the candidate character string is inputted is judged to be high, and the string is left as the J-th candidate character string in the candidate buffer 209 (step 1704).

For the processing of the steps 1403 and 1404 in the aforementioned flowchart of FIG. 16 (detailed procedure of the likelihood calculation processing with respect to the candidate character string in the step 804), a concrete example of likelihood calculation of handwriting in which characters "あい"are written such that the character "い"is superimposed on the character "あ"in the handwriting input area 301, and the candidate character string "あい"will be described in order of writing with reference to FIG. 25.

First, when the first stroke is written, collation is performed between the shape characteristic u[1 to 6] extracted from the stroke (first inputted stroke) and the shape characteristic s[1][1][1 to 6], σ[1][1][1 to 6] of the first stroke of the character structure data items corresponding to "あ"in the dictionary of character structure 211 (the dictionary of character structure of"あ"

When the second stroke is written, the structure characteristic u2[1 to 2] between the stroke and the previously inputted stroke (the first inputted stroke) is collated with the structure characteristics s2[1][1][1 to 2], σ2[1][1][1 to 2] between the first stroke and the second stroke of the dictionary of character structure of "あ"Additionally, the shape characteristic u[1 to 6] of the second input stroke is collated with the structure characteristics s[1][2][1 to 6], σ[1][2][1 to 6] of the second stroke of the dictionary of character structure of"あ"

The likelihood is similarly calculated also for the third input stroke. However, for the fourth input stroke, since the stroke is judged to be the first stroke of "い"the input stroke structure characteristic u2[1 to 2] between the third input stroke and the fourth input stroke is collated between the biliteral structure characteristics z[1 to 2], θ[1 to 2] of"あ"and "い"An accumulated value of the logarithm value of likelihood calculated by the collation is a logarithm likelihood between the input strokes and the candidate character string.

In the step 805, the character string estimating device 205 determines the determined character string, indeterminate character string, and indeterminate stroke string from the respective candidate character strings stored in the candidate buffer 209 and the collation result of each candidate character string.

FIG. 20 is a flowchart showing the processing procedure in the step 805. As shown in the flowchart, the character string estimation processing of step 805 is constituted of an estimation step 1801 of the determined character string and an estimation step 802 of the indeterminate character string and indeterminate stroke string.

Figure 21:
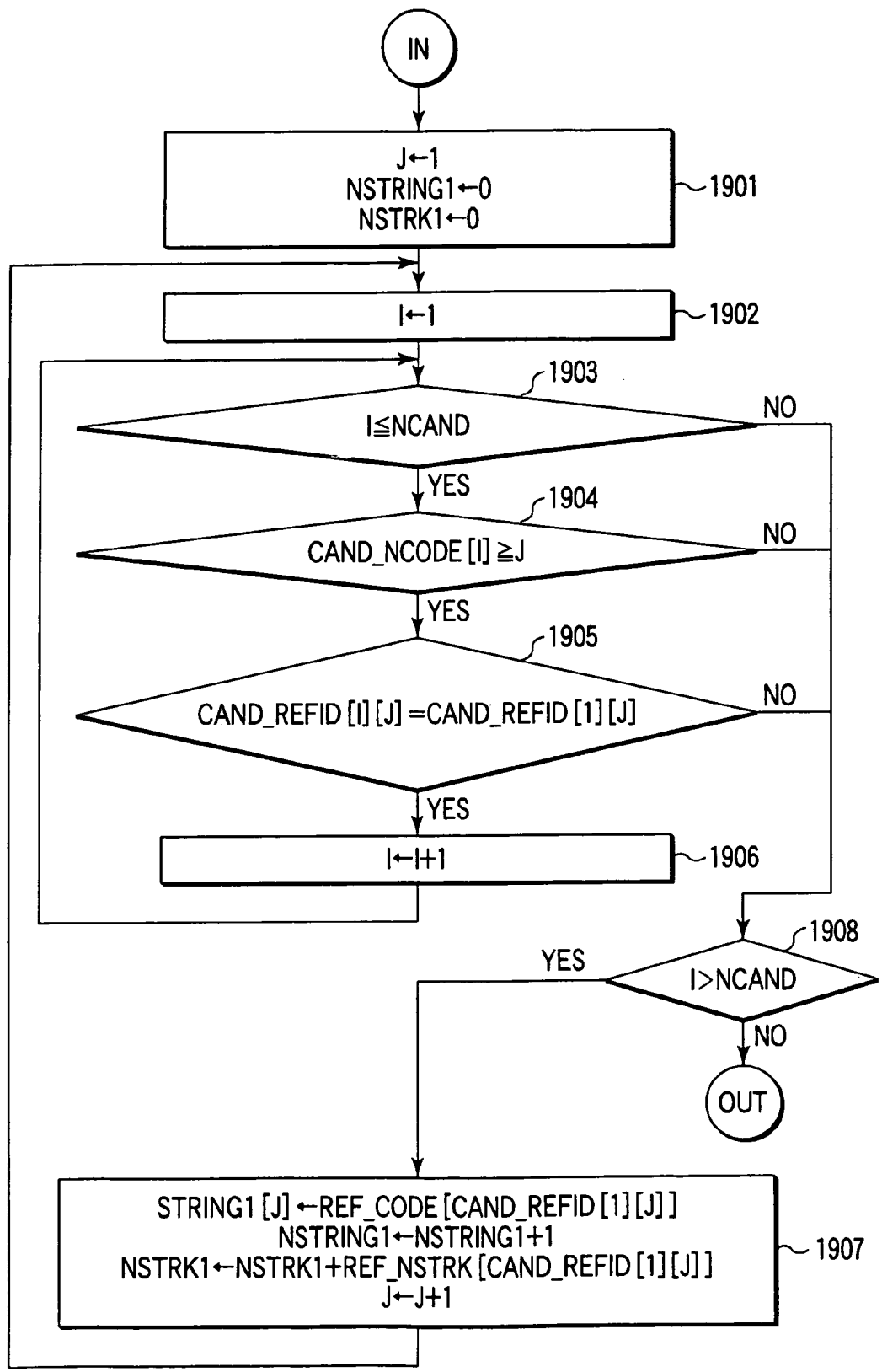
FIG. 21 is a flowchart showing a detailed processing procedure in a step 1801 in FIG. 20.

FIG. 21 is a flowchart showing the detailed processing procedure in the step 1801. Here, with respect to all the I-th candidate character strings (I=1 to NCAND) in the candidate buffer 209 (steps 1902, 1906, 1908), on a basis of the first candidate character string, a string of character codes STRING1[J] (J=1 to NSTRING1) which is configured by NSTRING1 characters common to all of the I-th candidate character strings from the top is extracted as a determined character string STRING1 (step 1907), and stored in the recognized result buffer 210. In the step 1907, total stroke number NSTRK1 of NSTRING1 characters is also obtained, and the total stroke number NSTRK1 is stored in the recognized result buffer 210, such that they are associated with the determined character string STRING1 stored in the recognized result buffer 210.

Figure 22:
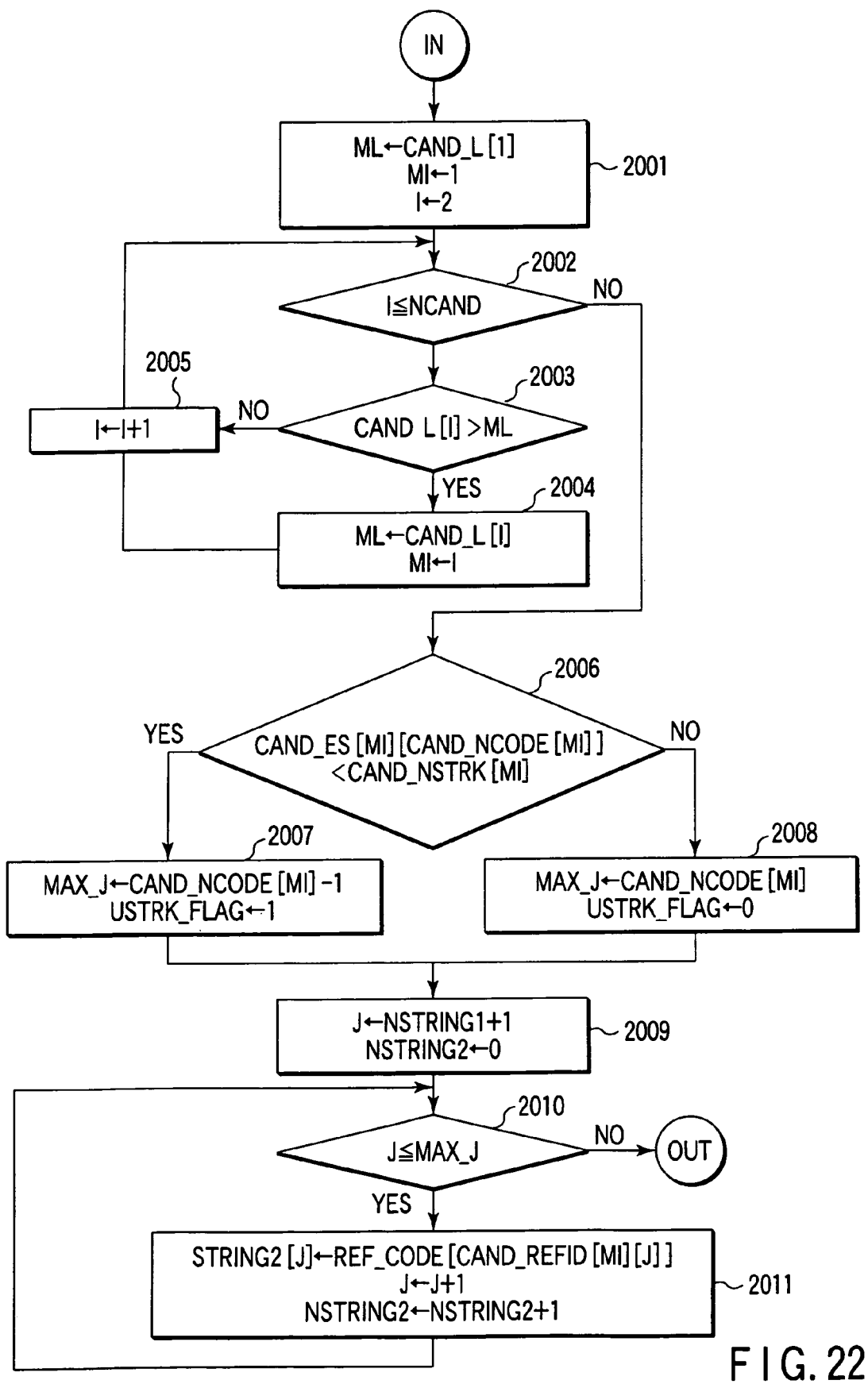
FIG. 22 is a flowchart showing a detailed processing procedure in a step 1802 in FIG. 20.

FIG. 22 is a flowchart showing the processing procedure in the step 1802. Here, first an MI-th candidate character string (most probable candidate character string) (MI is any one of 1 to NCAND) having a largest logarithm likelihood CAND_L[I] is obtained from all of the I-th candidate character strings (I=1 to NCAND) in the candidate buffer 209 (steps 2001 to 2005).

Subsequently, it is judged with respect to the obtained most probable candidate character string whether or not the last character of the candidate character string is being written by judging whether or not an end stroke number CAND_ES[MI][CAND_NCODE[MI]] of the strokes corresponding to the last character is smaller than a value of CAND_NSTRK[MI] indicating the total stroke number of the candidate character string (step 2006).

If the last character of the most probable candidate character string is being written, indeterminate stroke string information USTRK_FLAG is set to "1", and the character string constituted of NSTRING2 characters excluding the determined character string and last character are extracted from the most probable candidate character string. A string of character codes STRING2[J] (J=1 to NSTRING2) of the character string extracted from the determined character string, is stored in the recognized result buffer 210, as an indeterminate character string STRING2 (steps 2007, 2009 to 2011). In this case, the logarithm likelihood of the most probable candidate character string including the indeterminate character string may also be stored in the recognized result buffer 210 together with the indeterminate character string STRING2. The logarithm likelihood of the most probable candidate character string stored in the recognized result buffer 210 can also be used later in displaying the indeterminate character string STRING2 by the recognized result generating device 207.

On the other hand, when all the strokes of the last character of the most probable candidate character string are written, the indeterminate stroke string information USTRK_FLAG is set to "0", and the character string constituted of NSTRING2 characters excluding the determined character string is extracted from the most probable candidate character string. The string of character codes STRING2[J] (J=1 to NSTRING2) of the character string extracted from the most probable candidate character string portion is stored in the recognized result buffer 210 as a indeterminate character string STRING2 (steps 2008 to 2011).

As apparent from the above description, the determined character string STRING1 is the characters determined that all of the characters are surely written because the estimation result does not change if the further strokes are inputted.

Similarly, the indeterminate character string STRING2 is the characters having a possibility that the estimation result changes if the further strokes are inputted, but is estimated to be most probable in a meaning of maximum likelihood at this time. Moreover, the indeterminate stroke string information USTRK_FLAG represents presence/absence of the strokes that are the portion of the character that has not been written yet.

In the step 806 subsequent to the step 805, the recognized result generating device 207 converts the determined character string, indeterminate character string, and indeterminate stroke string in the recognized result buffer 210 to a display pattern, and displays the pattern in the recognized result display area 302 in the display screen of the display device 213.

Examples of display of the determined character string, indeterminate character string, and indeterminate stroke string information estimated every time one stroke is written are shown in a third row of FIG. 26. In FIG. 26, each stroke (inputted stroke) and stroke number of handwriting in which characters "あした"are written successively such that the character "い"is superimposed on the character "あ"and the character "た"is superimposed on the character "い"in the handwriting input area 301.

In FIG. 26, a black square symbol is a cursor indicating a character insertion position, and corresponds to the cursor C in FIG. 5. Moreover, a character string portion having no underline indicates the determined character string, and an underlined character string portion indicates the indeterminate character string. Furthermore, when the indeterminate stroke string information USTRK_FLAG is "1", a symbol "⇒"is displayed in the next character position of the indeterminate character string, and indicates existence of the indeterminate stroke string.

In the preset embodiment, a display displays such that the user can easily distinguish (visually recognize) the determined character string, indeterminate character string, and indeterminate stroke string information, whenever one stroke inputted. Therefore, the user can successively check a recognized result of the handwriting, and a comfortable character input is possible.

When the step 806 ends, the buffer updating device 206 updates the candidate buffer 209 in the step 807, and updates the stroke buffer 208 in the step 808.

A detailed processing procedure in the step 807 is shown in the flowchart of FIG. 23. Here, when the determined character string NSTRING1 exists, the information corresponding to the determined character string NSTRING1 is removed from the candidate character string with respect to the respective I-th candidate character strings (I=1 to NCAND) in the candidate buffer 209.

A detailed processing procedure in the step 808 is next shown in the flowchart of FIG. 24. Here, among NSTRK pieces of I-th stroke data (I=1 to NSTRK) in the stroke buffer 208, the I-th stroke data of I=NSTRK1+1 to NSTRK, that is, NSTRK1+1-th stroke data to NSTRK-th stroke data are used as NSTRK pieces (new NSTRK=old NSTRK−NSTRK1) of J-th stroke data. Then, a stroke buffer updating processing for removing the input stroke string data (constituted of the first stroke data to the NSTRK1 stroke data) corresponding to the determined character string NSTRING1 from the stroke buffer 208 is performed.

The buffer updating processing is roughly divided into a loop of steps of 2107, 2108, and steps 2109 to 2111. In the loop of steps 2107, 2108, the inputted stroke data corresponding to the character string excluding the last character in the determined character string NSTRING1 is deleted from the stroke buffer 208. In the steps 2109 to 2111, the inputted stroke data corresponding to the last character in the determined character string NSTRING1 is deleted from the stroke buffer 208.

In the step 809 subsequent to the step 808, for example, the buffer updating device 206 judges whether or not the candidate buffer 209 is empty. When the candidate character string exists, the flow returns to the step 802, the control is transferred to the handwriting information acquiring device 202, and the next stroke is taken.

On the other hand, the candidate buffer 209 is empty, it is then judged that the character string corresponding to all the inputted strokes is displayed/outputted, and the recognition processing ends.

Therefore, in the handwriting recognition apparatus in the embodiment, the character string continuously (successively) written by the user without being conscious of the end of the character string can be recognized with a high precision by the aforementioned processing procedure.

(Display Method of Recognized Result)

The recognized result generating device 207 of FIG. 4 converts the determined character string, indeterminate character string, and indeterminate stroke string information in the recognized result buffer 210 into the display pattern as described above, and displays the pattern in the recognized result display area 302 in the display screen of the display device 213.

One example of a display procedure of the recognized result by the recognized result generating device 207 in the step 806 of FIG. 10 will be described with reference to a flowchart shown in FIG. 27. The flowchart shown in FIG. 27 shows a procedure for displaying the determined character string and indeterminate character string among the recognized results. Particularly, when the indeterminate character string is displayed, the likelihood of the indeterminate character string is compared with a predetermined threshold value, and the display is updated. The likelihood of the indeterminate character string is a logarithm likelihood of the most probable candidate character strings including the indeterminate character string, when the character string estimating device 205 estimates the indeterminate character string. The logarithm likelihood is stored in the recognized result buffer 210 together with the indeterminate character string.

First, the recognized result generating device 207 extracts and displays the determined character string from the recognized result buffer 210. That is, the determined character string is converted to the display pattern, and the pattern is displayed in the recognized result display area 302 in the display screen of the display device 213 (step S11).

Subsequently, the indeterminate character string is displayed, but here, first the indeterminate character string and the logarithm likelihood stored together with the indeterminate character string are extracted from the recognized result buffer 210. Subsequently, when the value of the logarithm likelihood is larger than the predetermined threshold value (or not less than the threshold value), this-time indeterminate character string is displayed. That is, the indeterminate character string is converted to the display pattern, and the pattern is displayed in the recognized result display area 302 in the display screen of the display device 213 (steps S12, S13).

On the other hand, when the value of the logarithm likelihood stored together with the indeterminate character string is not more than the predetermined threshold value (or smaller than the threshold value), this-time indeterminate character string is not displayed, and the presently displayed indeterminate character string is displayed as it is (steps S12, S14).

Another example of the display procedure of the recognized result by the recognized result generating device 207 in the step 806 of FIG. 10 will be described with reference to a flowchart shown in FIG. 28. The flowchart shown in FIG. 28 also shows the procedure for displaying the determined character string and indeterminate character string among the recognized results. Particularly, when the indeterminate character string is displayed, the likelihood is compared with the likelihood of the presently displayed indeterminate character string, and the display is updated. Additionally, the likelihood of the indeterminate character string is a logarithm likelihood of the most probable candidate character strings including the indeterminate character string, when the character string estimating device 205 estimates the indeterminate character string. The logarithm likelihood is stored in the recognized result buffer 210 together with the indeterminate character string.

First, the recognized result generating device 207 extracts and displays the determined character string from the recognized result buffer 210. That is, the determined character string is converted to the display pattern, and the pattern is displayed in the recognized result display area 302 in the display screen of the display device 213 (step S21).

Subsequently, the indeterminate character string is displayed, but here, first the indeterminate character string and the logarithm likelihood stored together with the indeterminate character string are extracted from the recognized result buffer 210. Subsequently, when the value of the logarithm likelihood is larger than (or not less than) the value of the likelihood of the presently displayed indeterminate character string (held by the recognized result generating device 207), this-time indeterminate character string is displayed. That is, the indeterminate character string is converted to the display pattern, and the pattern is displayed in the recognized result display area 302 in the display screen of the display device 213 (steps S22, S23). Subsequently, the likelihood of this-time displayed indeterminate character string is held (step S24).

On the other hand, when the value of the logarithm likelihood stored together with the indeterminate character string is not more than (or smaller than) the value of the likelihood of the presently displayed indeterminate character string (held by the recognized result generating device 207), this-time indeterminate character string is not displayed, and the presently displayed indeterminate character string is displayed as it is (steps S22, S25).

Examples of display of the determined character string and indeterminate character string estimated every time one stroke is written when characters "てがき" are written successively such that the characters "てがき" are superimposed on each other in the handwriting input area 301, are shown in a fourth row of FIG. 29. In FIG. 29, the determined character string and indeterminate character string estimated every time each stroke (first stroke of "て", first stroke, second stroke, . . . of "が", . . . ) of the handwriting is inputted are shown.

In the fourth row of FIG. 29, the character string portion having no underline indicates the determined character string, and the underlined character string portion indicates the indeterminate character string.

In the embodiment, the display attribute is added in such a manner that the user can easily distinguish (visually recognize) the determined character string and indeterminate character string, every time one stroke is inputted. Therefore, the user can successively check the recognized result of the handwriting, and a comfortable and efficient handwriting character input is possible.

(Handwriting Display Method)

When the character is written on the handwriting input area 301, and the handwriting is not displayed at all, the position of the previous stroke cannot be confirmed. Therefore, the next written stroke deviates from an original input position, the correct character cannot be inputted, and miss-recognition is caused. Moreover, particularly when the size of the handwriting input area 301 is so small that only one character can be inputted, the characters are written successively such that the characters are superimposed on each other on the handwriting area 301. In this case, all the inputted strokes are displayed, the strokes other than those of the character being inputted are displayed, and therefore the strokes are illegible.

A method of displaying the stroke written in the handwriting input area 301 of the tablet 201 will next be described.

Figure 30:
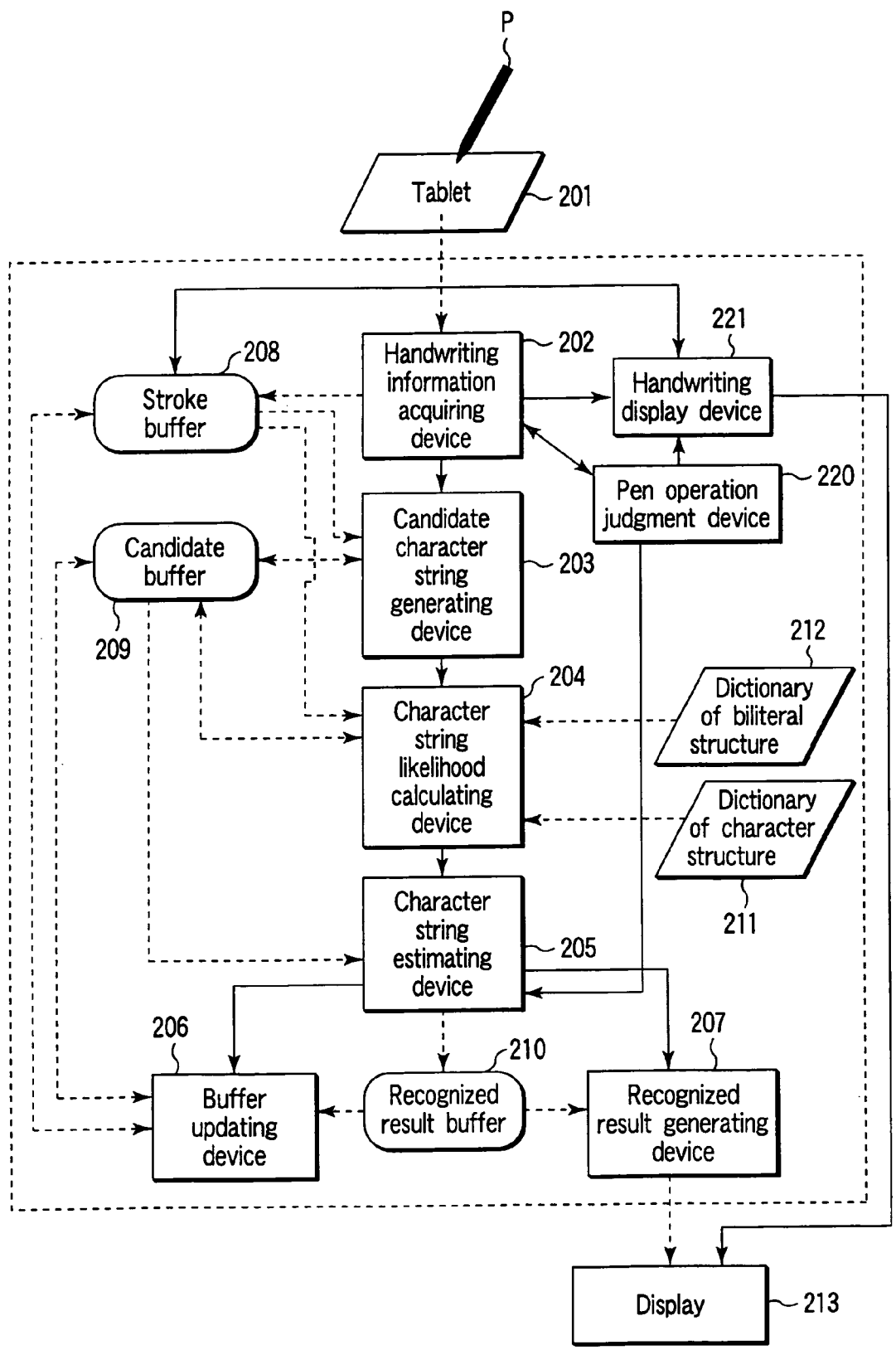
FIG. 30 is a block diagram showing a further detailed function configuration of the handwriting recognition apparatus realized by the information processing apparatus of FIG. 1, and a handwriting display device and pen operation judgment device are added to the configuration shown in FIG. 4.

FIG. 30 shows a constitution of the handwriting recognition apparatus including a handwriting display device for displaying the stroke written in the handwriting input area 301 of the tablet 201. Additionally, in FIG. 30, the same part as that of FIG. 4 is denoted with the same reference numeral, and only a different part will be described. That is, a handwriting display device 221 and pen operation judgment device 220 are newly added. Moreover, the tablet 201 is transparent, and is disposed on a handwriting display area of the display device 213 for displaying the handwriting written on the handwriting input area. When the stroke written on the tablet 201 with the pen P by the user is displayed in the display device 213, the user can see the displayed stroke via the tablet 201.

The handwriting display device 221 uses the stroke data acquired by the handwriting information acquiring device 202 to display the handwriting in the handwriting display area on the display device 213.

The handwriting information acquiring device 202 acquires the coordinate data indicating the position of the pen point when the pen P contacts the tablet. Therefore, the pen operation judgment device 220 judges a type of pen operation based on the coordinate data, and gives a instruction corresponding to a judgment result to the handwriting display device 221.

The handwriting display device 221 displays latest N inputted strokes including the stroke being inputted. The number N of strokes to be displayed is predetermined.

Figure 31:
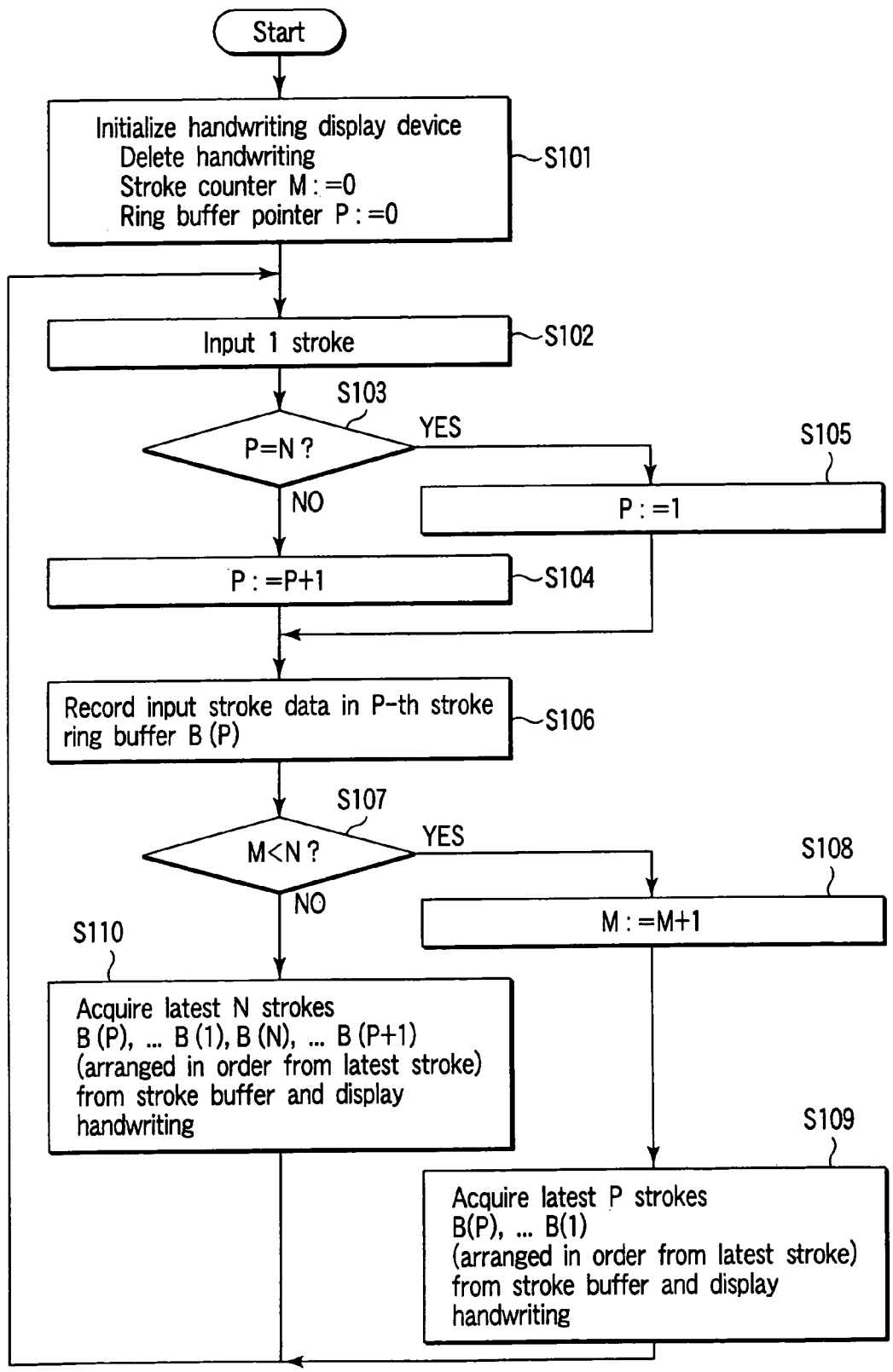
FIG. 31 is a flowchart showing a handwriting display processing operation of the handwriting display device.

A handwriting display processing operation of the handwriting display device 221 will next be described with reference to a flowchart shown in FIG. 31. Additionally, the processing shown in FIG. 31 is executed in the step S1 of FIG. 3.

In order to control the display of the latest N input strokes, the handwriting display device 221 includes a stroke counter M for counting the number of strokes inputted on the tablet 201 until the number reaches N, a stroke buffer B for storing the input stroke data, and a ring buffer pointer P indicating a storage position on the stroke buffer. The stroke buffer B has an area for storing N pieces of input stroke data, that is, first to N-th input stroke data. The ring buffer pointer P points at a first, second, third . . . storage areas of the stroke buffer B in order. After the pointer reaches an N-th storage area, the pointer returns to the first storage area. The storage area of the stroke buffer B is endlessly indicated in this manner. Additionally, here, for simplicity of the description, values which can be taken by the ring buffer pointer P are set to values indicating the respective first to N-th storage areas of the stroke data of the stroke buffer B, that is, 1 to N. A P-th storage area of the stroke buffer B is represented by B(P).

First, when a handwriting character input by the pen P is started, the handwriting display device 221 is initialized. The initialization comprises, for example, deleting the handwriting presently displayed in the handwriting display area if any, and setting the stroke counter M and ring buffer pointer P to "0" (step S101).

When one stroke is inputted (step S102), the value of the ring buffer pointer P is compared with N. When P is not equal to N (step S103), the flow advances to step S104 to increment the ring buffer pointer P by one. On the other hand, when P is equal to N in the step S103, the flow advances to step S105 to return the value of the ring buffer pointer P to "1" so that the ring buffer pointer P indicates the first storage area of the stroke buffer B.

The flow next advances to step S106. In the step S106, the stroke data inputted in the step S102 is stored in the P-th storage area of the stroke buffer B (step S106). Subsequently, when the number M of presently inputted strokes is smaller than N (or not more than N) (step S107), the flow advances to step S108. After the stroke counter M is incremented by one, the latest P strokes including the stroke data stored in the P-th storage area this time are extracted from the stroke buffer B, and the handwriting is displayed in step S109. In this case, when the stroke data stored in the stroke buffer B are arranged in order from the new data, B(P), B(P−1), ... B(1) result.

On the other hand, when the number M of presently inputted strokes is not less than N (or smaller than N) in the step S107, the stroke counter M is not updated, and the flow advances to step S110. The latest N strokes including the stroke data stored in the P-th storage area this time, are extracted from the stroke buffer B, and the handwriting is displayed. In this case, when the stroke data stored in the stroke buffer B are arranged in order from the new data, B(P), B(P−1), ... B(1), B(N), B(1), B(2), ... B(P+1) result.

Figure 32:
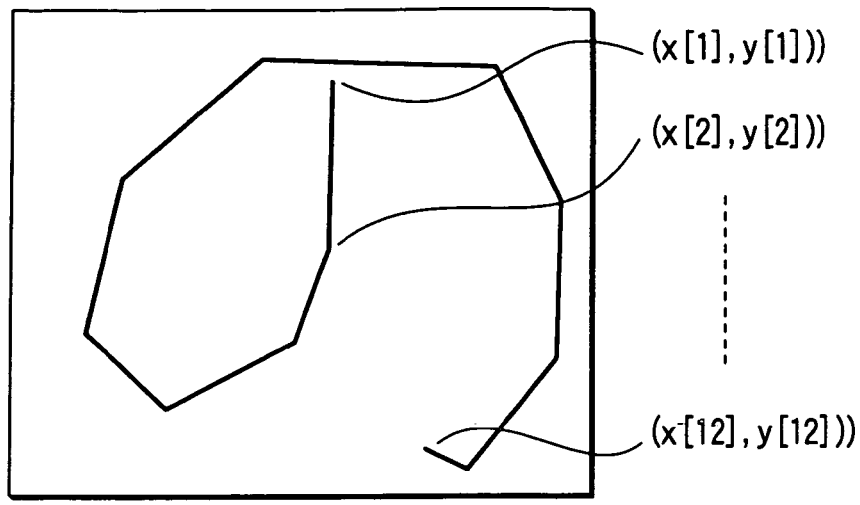
FIG. 32 is a diagram showing a display example of handwriting.

Here, a method of displaying the stroke data will be described. As described above, the stroke data is a two-dimensional coordinate data string indicating the position of the pen point while the pen P is in contact with the tablet 201. It is assumed that one stroke is constituted of J pieces of coordinate data. Each coordinate data is represented by (x[j], y[j]). Here, j=1 to J. For example, FIG. 32 shows a handwriting display example in which the user writes a character "の"(Japanese syllable (Hiragana)), the character "の"is constituted of one stroke. In this case, there are twelve coordinate points constituting the input stroke in total. Therefore, when a coordinate data string of twelve points (x[j], y[j]), j=1 to 12 are connected in order, the input stroke can be represented by a polygonal line.

Figure 33:
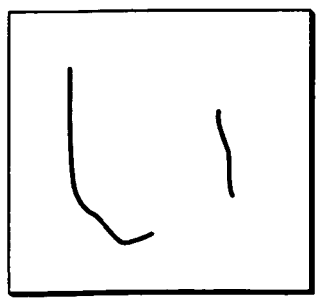
FIG. 33 is a diagram showing a handwriting display example of "い"(a Japanese syllable (a hiragana)) when N is set to "2".
Figure 34:
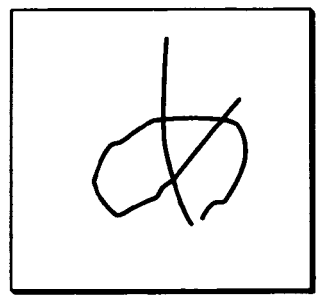
FIG. 34 is a diagram showing a handwriting display example of "あ"(a Japanese syllable (a hiragana)) when N is set to "2".
Figure 35:
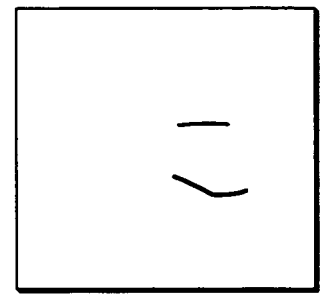
FIG. 35 is a diagram showing a handwriting display example of "た"(a Japanese syllable (a hiragana)) when N is set to "2".

When the handwriting of the input stroke is displayed in the procedure shown in FIG. 31, and N is set, for example, to "2", the handwriting is displayed in the handwriting display area of the display device 213 as shown in FIG. 33, FIG. 34 and FIG. 35. FIG. 33 shows a handwriting display example in which the second stroke of character "い"that is constructed of two strokes, has been inputted in the handwriting input area 301 of the tablet 201. FIG. 34 shows a handwriting display example in which the third stroke of character "あ"that is constructed of three strokes, has been inputted in the handwriting input area 301 of the tablet 201. As apparent also from FIG. 34, the first stroke is not displayed. Similarly, FIG. 35 shows a handwriting display example in which the fourth stroke of character "た"that is constructed of four strokes has been inputted in the character writing area 301 of the tablet 201. As apparent also from FIG. 35, the first and second strokes are not displayed.

Figure 36:
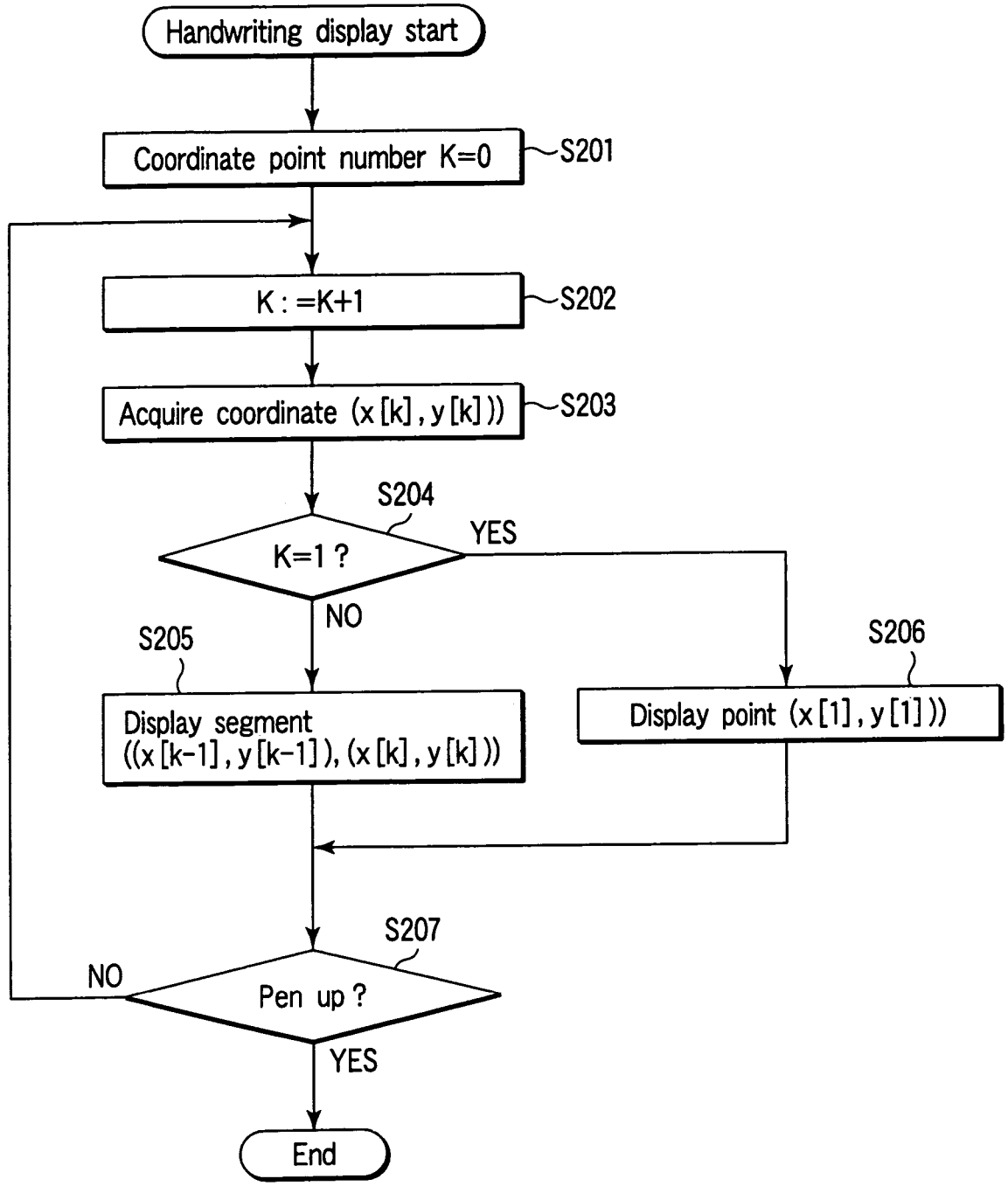
FIG. 36 is a flowchart showing a processing operation for displaying a stroke being written on a tablet simultaneously with the writing in real time.

It is desirable that the stroke written on the tablet 201 with the pen P by the user is displayed in the handwriting display area of the display device 213 simultaneously with writing in real time. A processing operation of the handwriting display device 221 will be described with reference to a flowchart shown in FIG. 36. Additionally, the display processing of the stroke being inputted shown in FIG. 36 is executed in the step S102 of FIG. 31.

As described above, the coordinate data indicating the position of the pen point while the pen P is in contact with the tablet is obtained by the handwriting information acquiring device 202 as described above. That is, the coordinate data acquired when the user writes one stroke is inputted in the handwriting display device 221. The handwriting display is started when the beginning of the coordinate data corresponding to one stroke is inputted in the handwriting display device 221, or when the pen point contacts the tablet first after the pen point is detached from the tablet (i.e., after the writing of one stroke ends).

First, a variable K for counting the number of coordinate points is set to "0" (step S201). Subsequently, the variable K is incremented by one (step S202), and the coordinate data (x[K], y[K]) is acquired (step S203). When a sum of the acquired coordinate points including the presently acquired coordinate point is only one, that is, when K=1 (step S204), the flow advances to step S206, and the coordinate point is displayed. On the other hand, when second or more coordinate point is acquired, that is, when K>1, the flow advances to step S205. When this-time coordinate data is (x[K], y[K]), a segment connecting this-time coordinate point to the previously displayed coordinate point (x[K−1], y[K−1]) is displayed. The steps S202 to S206 are repeated, until it is detected that the pen point is lifted up from the tablet (end of writing of one stroke) (step S207).

Additionally, to judge the end of writing of one stroke, the pen operation judgment device 220 may detect that the pen point is lifted up from the tablet, and inform the handwriting display device 221 that the pen point is lifted up from the tablet. Alternatively, the handwriting display device 221 may judge the end of writing of one stroke, when the input of coordinate data from the handwriting information acquiring device 202 is temporarily stopped.

Figure 37:
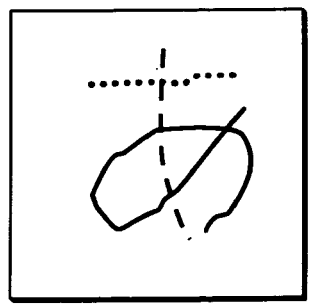
FIG. 37 is a diagram showing a display example of N latest strokes.

Moreover, N strokes may be displayed so that each one stroke can be distinguished. For example, the latest N strokes displayed may differ in color from each other, or the latest N strokes displayed may differ in line thickness from each other, or the latest N strokes displayed may differ in line style from each other. As shown in FIG. 37, the respective strokes may be displayed with different types of lines such as a solid line, dotted line, and broken line.

Additionally, the user may set the value of N to a desired value, or may set whether or not N input strokes are displayed. In this case, there can be provided an input environment of handwritten character for each user, which is optimum for the user.

The pen operation judgment device 220 judges the position on the tablet that the pen P contacts, and judges the type of pen operation as described above. Examples of the type of pen operation include an operation for writing (character) input, and other operations (e.g., cursor movement).

When the pen P contacts a handwriting input area on the tablet, a start of writing (character) input may be judged. When the character input is judged to be started, the processing operation shown in FIG. 3 or 31 is performed.

For example, when the pen P contacts the predetermined area other than the predetermined handwriting input area on the tablet, or when the pen point remains contact on the tablet in a range predetermined on the basis of the contact point for a predetermined time after the contact of the pen P on the tablet, the operation other than the writing input may be judged.

Moreover, a time after the pen point is detached from the tablet is measured. When the predetermined time is exceeded, the handwriting display device 221 is initialized. At this point of time, the handwriting displayed in the handwriting display area of the display device 213 may be deleted.

Even when the segmenting position of the character is not explicit, such as the characters that are written successively and superimposed on each other on the handwriting input area, the inputted handwriting can appropriately be displayed. There can be provided an environment in which the handwritten character is easily inputted.

(Additional Function of Handwriting Recognition Apparatus)

An additional function of the handwriting recognition apparatus will be described hereinafter with reference to the constitution example shown in FIG. 30.

In the aforementioned embodiment, as shown in FIG. 5, the handwriting input area 301 is separated from the recognized result display area 302. However, a pen input for instructing the movement of the cursor C indicating the character insertion position can be realized even in the recognized result display area 302. That is, in the embodiment, when the display device 213 includes the handwriting display area and recognized result display area, the transparent tablet 201 is disposed to cover the areas, and the user can see the handwriting displayed in the display apparatus 213 via the tablet 201. Additionally, when an arbitrary position in the recognized result display area 302 is designated with the pen P, the character string obtained as the recognized result can be subjected to an edition operation. An instruction for the edition operation is sometimes called "gesture".

For example, the pen operation judgment device 220 detects that the arbitrary position in the recognized result display area 302 is designated (contacted) by the pen P in the constitution shown in FIG. 30. In this case, the cursor movement is instructed, and it is judged that the writing of the character string is completed. Moreover, when there is an indeterminate character string at this time, the character string estimating device 205 is instructed to allow the recognized result generating device 207 to display the indeterminate character string as the determined character string in the recognized result display area 302 (determination processing). Moreover, when there is an indeterminate stroke string in this case, the character string estimating device 205 deletes the indeterminate stroke string from the stroke buffer 208. This deletion processing may also be performed by the buffer updating device 206.

In this manner, it is possible to repeat the indication of the character insertion position and the character string writing operation, and comfortable character input is possible. Additionally, similarly as the respective devices 202 to 207, the pen operation judgment device 220 can be realized, when the CPU 1 in the information processing apparatus of FIG. 1 executes the handwriting recognition program.

Moreover, in the constitution of the present embodiment, the pen operation judgment device 220 detects that there is not the next stroke input for the predetermined or more time after the input of the last stroke. Furthermore, the pen operation judgment device 220 detects that there is not the next stroke input for the predetermined or more time. Even in this case, the pen operation judgment device 220 judges that the writing of the presently written character string is completed, and performs the determination processing similarly as described above.

A example of the display screen before and after the determination processing is shown in FIG. 26. In FIG. 26, the display screen before and after the determination processing is shown with each stroke (input stroke) and stroke number of the handwriting obtained by writing characters "あした"successively and superimposed on each other on the handwriting input area, in third and fifth rows of FIG. 26.

Figure 38:
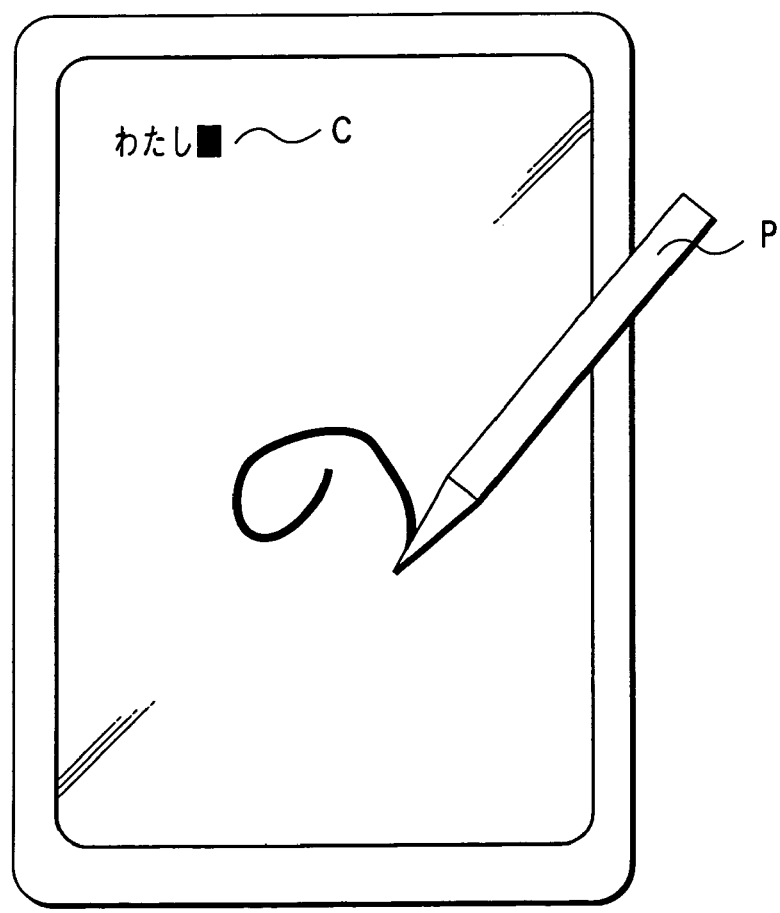
FIG. 38 is a diagram showing a modification example of the appearance of the information processing apparatus of FIG. 1.

Moreover, the handwriting input area 301 and recognized result display area 302 shown in FIG. 5 may also be set to be common as shown in FIG. 38. In this constitution, when the coordinate of the pen point does not move from the predetermined area including the contact point for the predetermined or more time, the pen operation judgment device 220 judges the pen input to be a gesture for instructing the movement of the cursor C indicating the character insertion position. When the pen operation judgment device 220 judges the pen input to be the gesture, the character string estimating device 205 may perform the determination processing for outputting the indeterminate character string as the determined character string similarly as described above.

Additionally, the handwriting recognition apparatus of the embodiment includes the one-character back-space deletion button (delete button) 303 shown in FIG. 5 as an edition operation device (one-character back-space deletion instruction device) for deleting a character inputted by mistake. When the user touches the delete button 303 with the pen P, and the coordinate data is in the area of the delete button 303, the pen operation judgment device 220 judges the instruction for one-character back-space deletion. Therefore, deletion of the character immediately before the character position indicated by the cursor C can be instructed.

In the embodiment, there is provided a recognized result edition device (not shown) for deleting the symbol "⇒"that is displayed in the recognized result display area 302 and indicates the presence of the indeterminate stroke string, as shown by the third row of FIG. 26, when the one-character back-space deletion is instructed.

When there is no indeterminate stroke string, but the indeterminate character string exists, and the one-character back-space deletion is instructed, the recognized result edition device deletes the end of the indeterminate character string. Additionally, a remaining indeterminate character string is determined and displayed as the determined character string. Moreover, when there is neither indeterminate stroke string nor indeterminate character string, and the one-character back-space deletion is instructed, the recognized result edition device deletes the end of the determined character string.

When such processing mentioned above is executed, the deletion of the character, and the writing operation of the character can continuously and smoothly be performed, and a comfortable character edition environment is realized. A example of the display screen before and after the one-character back-space deletion instruction in inputted, is shown in FIG. 26. In FIG. 26, the display screen before and after the one-character back-space deletion instruction in inputted is shown with each stroke (input stroke) and stroke number of the handwriting obtained by writing characters "あした"successively and superimposed on each other on the handwriting input area, in third and fourth rows of FIG. 26.

The aforementioned instruction for one-character back-space deletion is not limited to the button (delete button 303). For example, the pen operation judgment device 220 may also judge that a stroke having a specified shape written in the handwriting input area 301 is the gesture for instructing the one-character back-space deletion. Additionally, for example, an input of linear stroke to the right from the left, which is not inputted in the usual character writing, can also be determined as the gesture for one-character back-space deletion. The pen operation judgment device 220 can easily be realized by collation of the stroke shape characteristic for use in the character recognition.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

what is claimed is:

1. A handwriting recognition apparatus comprising:
an input device including a handwriting input area and configured to input a plurality of strokes constructing a plurality of characters written successively on the handwriting input area; and
a recognition device configured to;
generate, whenever one stroke is input by the input device, a candidate for a recognized character string with respect to the presently inputted strokes;
collate shapes of the presently inputted strokes with shapes of characters of the candidate, based on a dictionary of character structure;
collate first positional relations between the presently inputted strokes with second positional relations between strokes of each character of the candidate, based on the dictionary of character structure; and
collate the first positional relations with third positional relations between strokes of one character and strokes of another character in the candidate, based on a dictionary of biliteral structure, to obtain a first recognized character string, the dictionary of the biliteral structure having a plurality of registered biliteral structure data items, each of the biliteral structure data items indicating structural relation between two characters which are written successively such that one of the two characters is superimposed on the other, the structural relation between the two characters indicating positional relations at least between one or more strokes that configures a first character of the two characters to one or more strokes that configures a second character of the two characters, in a case when the first and second characters are written successively.

2. A handwriting recognition apparatus comprising:
an input device including a handwriting input area and configured to input a plurality of strokes constructing a plurality of characters which are written successively and superimposed on each other on the handwriting input area, a size of the handwriting area corresponding to a size of one character; and
a recognition device configured to;
generate, whenever one stroke is input by the input device, a candidate for a recognized character string with respect to the presently inputted strokes;
collate shapes of the presently inputted strokes with shapes of characters of the candidate, based on a dictionary of character structure;
collate first positional relations between the presently inputted strokes with second positional relations between strokes of each character of the candidate, based on the dictionary of character structure; and
collate the first positional relations with third positional relations between strokes of one character and strokes of another character in the candidate, based on a dictionary of biliteral structure, to obtain a first recognized character string, the dictionary of the biliteral structure having a plurality of registered biliteral structure data items, each of the biliteral structure data items indicating structural relation between two characters which are written successively such that one of the two characters is superimposed on the other, the structural relation between the two characters indicating positional relations at least between one or more strokes that configures a first character of the two characters to one or more strokes that configures a second character of the two characters, in a case when the first and second characters are written successively.

3. A handwriting recognition apparatus according to claim 1, further comprising:
a display configured to display the first recognized character string.

4. A handwriting recognition apparatus according to claim 2, further comprising:
a display configured to display the first recognized character string.

5. A handwriting recognition apparatus according to claim 3, wherein:
the recognition device is further configured to recognize a second character string from one or more strokes which are input by the input device and are other than strokes constructing the first recognized character string, whenever one stroke is input by the input device, to obtain one or more indeterminate character string; and
the display is further configured to display the one or more indeterminate character string.

6. A handwriting recognition apparatus according to claim 4, wherein:
the second recognition device is further configured to recognize a second character string from one or more strokes which are input by the input device and are other than strokes constructing the first recognized character string, whenever one stroke is input by the input device, to obtain one or more indeterminate character string; and
the display is further configured to display the one or more indeterminate character string.

7. A handwriting recognition apparatus according to claim 5, further comprising:
a determining device configured to determine the one or more indeterminate character string as the first recognized character string, when strokes are not input by the input device during a given period, after strokes for the first recognized character string are inputted.

8. A handwriting recognition apparatus according to claim 6, further comprising:
a determining device configured to determine the one or more indeterminate character string as the first recognized character string, when the strokes are not input by the input device during a given period, after strokes for the first recognized character string are input.

9. A handwriting recognition apparatus according to claim 3 further comprising:
a strokes display configured to display latest N (N is a given integer) strokes including a latest stroke input by the input device, whenever one stroke is input by the input device.

10. A handwriting recognition apparatus according to claim 4 further comprising:
a strokes display configured to display latest N (N is a given integer) strokes including a latest stroke input by the input device, whenever one stroke is input by the input device.

11. A handwriting recognition apparatus according to claim 9 wherein the strokes display displays the latest N strokes such that the latest N strokes differ in at least one of color, line thickness and line style from each other.

12. A handwriting recognition apparatus according to claim 10 wherein the strokes display displays the latest N strokes such that the latest N strokes differ in at least one of color, line thickness and line style from each other.

13. A computer implemented handwriting recognition method for recognizing a plurality of characters written successively on a handwriting input area, the method comprising:
- inputting a plurality of strokes constructing the plurality of characters written successively on the handwriting input area to obtain input strokes;
- generating, whenever one stroke is input by the input device, a candidate for a recognized character string with respect to the presently inputted strokes;
- collating shapes of the presently inputted strokes with shapes of characters of the candidate, based on a dictionary of character structure;
- collating first positional relations between the presently inputted strokes with second positional relations between strokes of each character of the candidate, based on the dictionary of character structure; and
- collating the first positional relations with third positional relations between strokes of one character and strokes of another character in the candidate, based on a dictionary of biliteral structure, to obtain a first recognized character string, the dictionary of the biliteral structure having a plurality of registered biliteral structure data items, each of the biliteral structure data items indicating structural relation between two characters which are written successively such that one of the two characters is superimposed on the other, the structural relation between the two characters indicating positional relations at least between one or more strokes that configures a first character of the two characters to one or more strokes that configures a second character of the two characters, in a case when the first and second characters are written successively.

14. A computer implemented handwriting recognition method for recognizing a plurality of characters written successively on a handwriting input area, the method comprising:
- inputting a plurality of strokes constructing the plurality of characters which are written successively and superimposed on each other on the handwriting input area to obtain input strokes, a size of the handwriting area corresponding to a size of one character;
- generating, whenever one stroke is input by the input device, a candidate for a recognized character string with respect to the presently inputted strokes;
- collating shapes of the presently inputted strokes with shapes of characters of the candidate, based on a dictionary of character structure;
- collating first positional relations between the presently inputted strokes with second positional relations between strokes of each character of the candidate, based on the dictionary of character structure; and
- collating the first positional relations with third positional relations between strokes of one character and strokes of another character in the candidate, based on a dictionary of biliteral structure, to obtain a first recognized character string, the dictionary of the biliteral structure having a plurality of registered biliteral structure data items, each of the biliteral structure data items indicating structural relation between two characters which are written successively such that one of the two characters is superimposed on the other, the structural relation between the two characters indicating positional relations at least between one or more strokes that configures a first character of the two characters to one or more strokes that configures a second character of the two characters, in a case when the first and second characters are written successively.

15. A non-transitory computer readable medium having computer instructions recorded thereon that can be read by a computer, the computer including a handwriting input area, the computer instructions comprising:
- first program instruction means for instructing a computer processor to input a plurality of strokes constructing the plurality of characters written successively on the handwriting input area to obtain input strokes; and
- second program instruction means for instructing the computer processor to:
  - generate, whenever one stroke is input by the input device, a candidate for a recognized character string with respect to the presently inputted strokes;
  - collate shapes of the presently inputted strokes with shapes of characters of the candidate, based on a dictionary of character structure;
  - collate first positional relations between the presently inputted strokes with second positional relations between strokes of each character of the candidate, based on the dictionary of character structure; and
  - collate the first positional relations with third positional relations between strokes of one character and strokes of another character in the candidate, based on a dictionary of biliteral structure, the dictionary of the biliteral structure having a plurality of registered biliteral structure data items, each of the biliteral structure data items indicating structural relation between two characters which are written successively such that one of the two characters is superimposed on the other, the structural relation between the two characters indicating positional relations at least between one or more strokes that configures a first character of the two characters to one or more strokes that configures a second character of the two characters, in a case when the first and second characters are written successively.

16. A non-transitory computer readable medium having computer instructions recorded thereon that can be read by a computer, the computer including a handwriting input area whose size corresponds to a size of one character, the computer instructions comprising:
- first program instruction means for instructing a computer processor to input a plurality of strokes constructing the plurality of characters written successively and superimposed on each other on the handwriting input area to obtain input strokes;
- second program instruction means for instructing the computer processor to:
  - generate, whenever one stroke is input by the input device, a candidate for a recognized character string with respect to the presently inputted strokes;
  - collate shapes of the presently inputted strokes with shapes of characters of the candidate, based on a dictionary of character structure;
  - collate first positional relations between the presently inputted strokes with second positional relations between strokes of each character of the candidate, based on the dictionary of character structure; and collate the first positional relations with third positional relations between strokes of one character and strokes of another character in the candidate, based on a dictionary of biliteral structure, the dictionary of the biliteral structure having a plurality of registered biliteral structure data items, each of the biliteral structure data items indicating structural relation between two characters which are written successively such that one of the two characters is superimposed on the other, the structural relation between the two characters indicating positional relations at least between one or more strokes that configures a first character of the two characters to one or more strokes that configures a second character of the two characters, in a case when the first and second characters are written successively.

* * * * *